US012801048B2

(12) United States Patent
Ishizuka et al.

(10) Patent No.: US 12,801,048 B2
(45) Date of Patent: Nov. 17, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Daisuke Ishizuka, Kanagawa (JP); Erina Saito, Kanagawa (JP); Tsutomu Furuta, Kanagawa (JP); Daisuke Nakashima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 724 days.

(21) Appl. No.: 18/325,961

(22) Filed: May 30, 2023

(65) Prior Publication Data

US 2024/0192619 A1 Jun. 13, 2024

(30) Foreign Application Priority Data

Nov. 25, 2022 (JP) ................................ 2022-188723

(51) Int. Cl.
*G03G 9/087* (2006.01)
*G03G 9/08* (2006.01)

(52) U.S. Cl.
CPC ....... *G03G 9/08797* (2013.01); *G03G 9/0821* (2013.01); *G03G 9/08755* (2013.01); *G03G 9/08795* (2013.01)

(58) Field of Classification Search
CPC ............. G03G 9/08797; G03G 9/0821; G03G 9/08755; G03G 9/08795
See application file for complete search history.

(56) References Cited

U.S. PATENT DOCUMENTS

| | | | | |
|---|---|---|---|---|
| 9,116,449 | B2 | 8/2015 | Sakamoto et al. | |
| 2014/0287353 | A1* | 9/2014 | Sakamoto ............. | G03G 9/093 430/108.4 |

(Continued)

FOREIGN PATENT DOCUMENTS

| | | |
|---|---|---|
| JP | 2009104193 | 5/2009 |
| JP | 2014186278 | 10/2014 |
| JP | 2021127431 | 9/2021 |

*Primary Examiner* — Boone Alexander Evans
(74) *Attorney, Agent, or Firm* — JCIPRNET

(57) ABSTRACT

An electrostatic charge image developing toner that contains toner particles containing a binder resin containing an amorphous resin and a crystalline resin, and satisfying the following condition (1) and condition (2), condition (1): in a case where differential scanning calorimetry is performed by the following thermal process (1), a total amount of heat generated at an exothermic peak in a temperature range of 30° C. or higher and 70° C. or lower during a reheating period is more than 0.5 J/g, condition (2): in a case where differential scanning calorimetry is performed by the following thermal process (2), a total amount of heat generated at an exothermic peak in a temperature range of 30° C. or higher and 70° C. or lower during a reheating period is 0.5 J/g or less, thermal process (1): heating to 150° C. from 0° C. at a rate of 10° C./min, then cooling to 0° C. from 150° C. at a rate of 50° C./min, followed by reheating to 150° C. from 0° C. at a rate of 10° C./min, thermal process (2): heating to 150° C. from 0° C. at a rate of 10° C./min, then cooling to 0° C. from 150° C. at a rate of 1° C./min, followed by reheating to 150° C. from 0° C. at a rate of 10° C./min.

18 Claims, 2 Drawing Sheets

(56) References Cited

U.S. PATENT DOCUMENTS

| | | | | |
|---|---|---|---|---|
| 2015/0044605 | A1* | 2/2015 | Koyama | G03G 13/095 430/119.86 |
| 2017/0160660 | A1* | 6/2017 | Hasegawa | G03G 9/0825 |
| 2019/0332025 | A1* | 10/2019 | Tsuchihashi | G03G 9/09392 |
| 2021/0253845 | A1 | 8/2021 | Nakamura et al. | |

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-188723 filed Nov. 25, 2022.

BACKGROUND

(i) Technical Field

The present disclosure relates to an electrostatic charge image developing toner, an electrostatic charge image developer, a toner cartridge, a process cartridge, an image forming apparatus, and an image forming method.

(ii) Related Art

JP2009-104193A discloses an image forming toner obtained by directly polymerizing a toner composition containing at least a polymerizable monomer, binder resins, wax (D), and a colorant in a water phase, in which at least one of the binder resins is a crystalline polymer (A), and a DSC curve of the toner has at least one exothermic peak near the glass transition temperature of the binder resins in a second heating process.

JP2014-186278A discloses an electrostatic charge image developing toner that contains an amorphous polyester resin and a crystalline polyester resin as binder resins, in which the electrostatic charge image developing toner going through first heating, cooling at −10° C./min, and second heating for differential scanning calorimetry has an endothermic peak (1) derived from a resin formed by the compatibilization of the amorphous polyester resin and the crystalline polyester resin in the first heating, does not have an exothermic peak of intensity of 0.1 J/g or more in the first heating, and has at least one exothermic peak (2) in a temperature range lower than the endothermic peak (1) by 5° C. or higher and 15° C. or lower in the second heating.

SUMMARY

Aspects of non-limiting embodiments of the present disclosure relate to an electrostatic charge image developing toner that forms an image being unlikely to deteriorate the adhesive strength of a laminate film in a case where a recording medium on which the image is formed and which is subjected to a hot lamination process is placed in an environment with temperature changes.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above object include the following aspect.

According to an aspect of the present disclosure, there is provided an electrostatic charge image developing toner that contains toner particles containing a binder resin containing an amorphous resin and a crystalline resin and satisfying the following condition (1) and condition (2).

Condition (1): in a case where differential scanning calorimetry is performed by the following thermal process (1), a total amount of heat generated at an exothermic peak in a temperature range of 30° C. or higher and 70° C. or lower during a reheating period is more than 0.5 J/g.

Condition (2): in a case where differential scanning calorimetry is performed by the following thermal process (2), a total amount of heat generated at an exothermic peak in a temperature range of 30° C. or higher and 70° C. or lower during a reheating period is 0.5 J/g or less.

Thermal process (1): heating to 150° C. from 0° C. at a rate of 10° C./min, then cooling to 0° C. from 150° C. at a rate of 50° C./min, followed by reheating to 150° C. from 0° C. at a rate of 10° C./min.

Thermal process (2): heating to 150° C. from 0° C. at a rate of 10° C./min, then cooling to 0° C. from 150° C. at a rate of 1° C./min, followed by reheating to 150° C. from 0° C. at a rate of 10° C./min.

BRIEF DESCRIPTION OF THE DRAWINGS

Exemplary embodiment(s) of the present invention will be described in detail based on the following figures, wherein.

DETAILED DESCRIPTION

Figure 1:
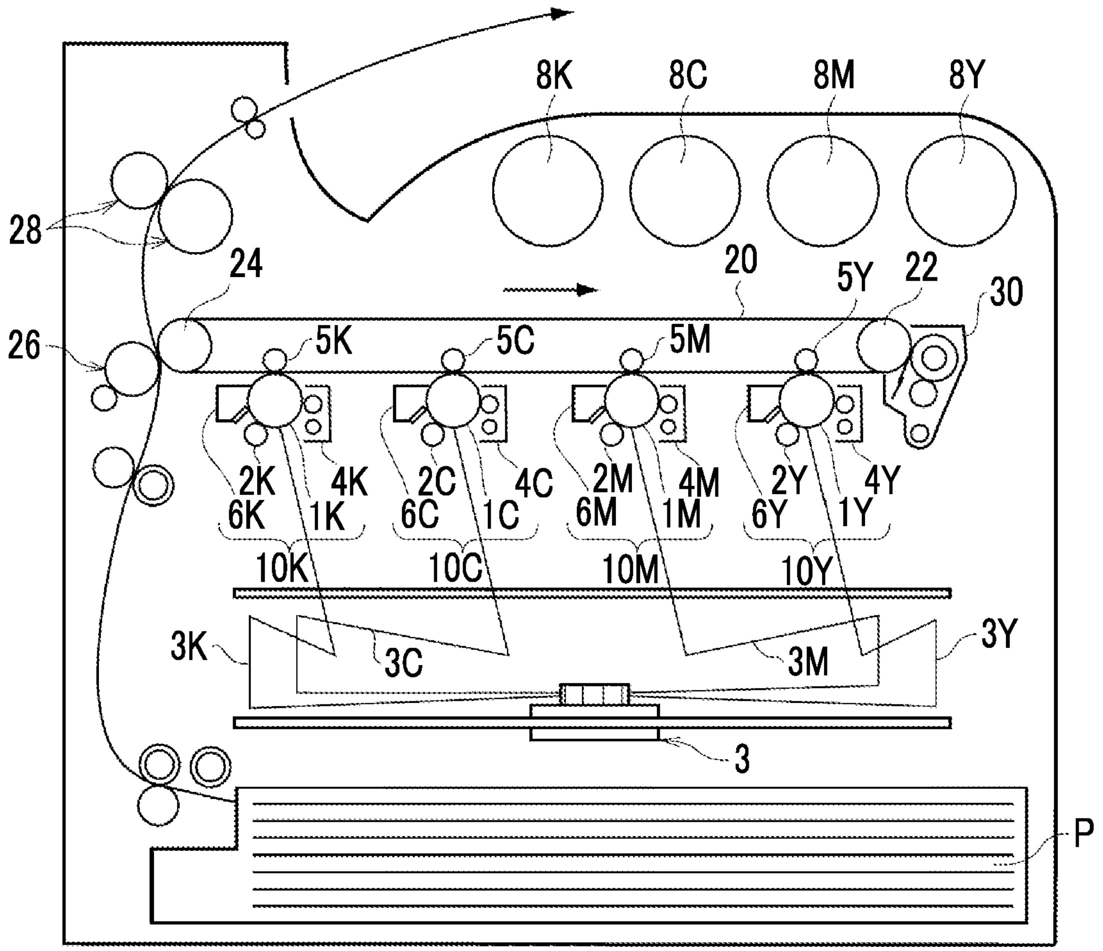
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more substances corresponding to each component in the composition, unless otherwise specified, the amount of each component means the total amount of two or more substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, "(meth)acryl" is an expression including both the acryl and methacryl, and "(meth)acrylate" is an expression including both the acrylate and methacrylate.

In the present disclosure, "electrostatic charge image developing toner" is also called "toner", "electrostatic charge image developer" is also called "developer", and "electrostatic charge image developing carrier" is also called "carrier".

In the present disclosure, "hot lamination process" means a process of laminating a laminate film on a recording medium and applying heat and pressure thereto such that the recording medium is partially or totally covered with the laminate film. The hot lamination process may be performed on one surface or both surfaces of the recording medium.

From the viewpoint of not deteriorating visibility of an image on the recording medium, the laminate film is, for example, preferably transparent. The material of the laminate film is not limited. Examples of the material of the laminate film include polyethylene terephthalate, polypropylene, polyvinyl chloride, and the like.

The temperature applied to the recording medium and the laminate film during the hot lamination process is, for example, preferably 60° C. or higher and 160° C. or lower, more preferably 70° C. or higher and 150° C. or lower, and even more preferably 80° C. or higher and 140° C. or lower.

Electrostatic Charge Image Developing Toner

The toner according to the present exemplary embodiment contains toner particles that contain a binder resin containing an amorphous resin and a crystalline resin, and satisfy the following condition (1) and condition (2).

Condition (1): In a case where differential scanning calorimetry is performed by a thermal process (1), a total amount of heat generated at an exothermic peak in a temperature range of 30° C. or higher and 70° C. or lower during a reheating period is more than 0.5 J/g.

Condition (2): In a case where differential scanning calorimetry is performed by a thermal process (2), a total amount of heat generated at an exothermic peak in a temperature range of 30° C. or higher and 70° C. or lower during a reheating period is 0.5 J/g or less.

Thermal process (1): heating to 150° C. from 0° C. at a rate of 10° C./min, then cooling to 0° C. from 150° C. at a rate of 50° C./min, followed by reheating to 150° C. from 0° C. at a rate of 10° C./min.

Thermal process (2): heating to 150° C. from 0° C. at a rate of 10° C./min, then cooling to 0° C. from 150° C. at a rate of 1° C./min, followed by reheating to 150° C. from 0° C. at a rate of 10° C./min.

In a case where differential scanning calorimetry is performed on the toner particles of the present exemplary embodiment by the thermal process (1), at least one exothermic peak is observed in a temperature range of 30° C. or higher and 70° C. or lower during the reheating period. In a case where differential scanning calorimetry is performed on the toner particles of the present exemplary embodiment by the thermal process (2), an exothermic peak may or may not be observed in a temperature range of 30° C. or higher and 70° C. or lower during the reheating period.

The rate of cooling to 0° C. from 150° C. varies between the thermal process (1) and the thermal process (2).

In the thermal process (1), the rate of cooling to 0° C. from 150° C. is 50° C./min, which is relatively high. That is, in the thermal process (1), the toner is heated, rapidly cooled, and reheated.

In the thermal process (2), the rate of cooling to 0° C. from 150° C. is 1° C./min, which is relatively low. That is, in the thermal process (2), the toner is heated, slowly cooled, and reheated.

The thermal process (1) is a thermal process that simulates fixing of a toner image on a recording medium (heating and rapid cooling) and a hot lamination process on the recording medium on which the image is formed (reheating).

The thermal process (2) is a thermal process that simulates placing the laminated product in an environment with temperature changes (heating, slow cooling, and reheating).

The toner particles containing an amorphous resin and a crystalline resin include toner particles that are found to generate heat in the reheating process and toner particles that are found not to generate heat in the reheating process, in a case where differential scanning calorimetry is performed. The heat generation results from the crystallization of the crystalline resin. Whether or not heat generation is observed depends generally on the combination of the amorphous resin and the crystalline resin contained in the toner particles.

The toner particles satisfying the condition (1) are toner particles in which the crystalline resin crystallizes during the reheating following the rapid cooling.

The toner particles satisfying the condition (2) are toner particles in which the crystalline resin does not crystallize during the reheating following the slow cooling.

In a case where a recording medium on which an image is formed using a toner and which is subjected to a hot lamination process is placed in an environment where temperature repeatedly rises and drops (for example, by a window in a room or in a vehicle exposed to direct sunlight), sometimes the adhesive strength of the laminate film deteriorates. This phenomenon is likely to occur in a case where the image is formed of a toner that contains a crystalline resin and is fixed at a relatively low temperature.

Satisfying both the condition (1) and condition (2), the toner according to the present exemplary embodiment suppresses the above phenomenon. The reason is presumed as follows.

Satisfying the condition (1) means that the crystalline resin crystallizes during the hot lamination process. In other words, not satisfying the condition (1) means that the crystalline resin does not crystallize during the hot lamination process. In a case where the crystalline resin does not crystallize during the hot lamination process, the image is likely to permeate into the recording medium, and the adhesion between the image and the laminate film is insufficient. Satisfying the condition (1) suppresses this phenomenon.

Presumably, the crystalline resin having crystallized during the hot lamination process may be melted by heat and pressure in a later stage of the hot lamination process, may spread at the interface between the image and the laminate film, and may allow the image and the laminate film to adhere together at the interface therebetween after cooling.

On the other hand, satisfying the condition (2) means that the crystalline resin does not crystallize in an environment where the temperature rises and drops repeatedly (for example, by a window in a room or in a vehicle exposed to direct sunlight), and the volume of the image is unlikely to change. As a result, the adhesion between the image and the laminate film is maintained.

In a case where the condition (1) is not satisfied, the adhesion between the image and the laminate film during the hot lamination process is insufficient. In a case where the condition (2) is not satisfied, the adhesive strength deteriorates after the hot lamination process. Satisfying both the condition (1) and condition (2), the toner according to the present exemplary embodiment results in sufficient adhesion between the image and the laminate film during the hot lamination process, and makes it difficult for the adhesive strength of the laminate film to deteriorate in a case where the laminated product is placed in an environment with temperature changes.

In order to obtain an exothermic peak in a temperature range of 30° C. or higher and 70° C. or lower, for example, the melting temperature of the crystalline resin is preferably set to 50° C. or higher and 90° C. or lower. Usually, crystallization (heat generation) during reheating occurs at a temperature approximately 10° C. to 30° C. lower than the melting temperature of the crystalline resin. Therefore, by adjusting the melting temperature of the crystalline resin, it is possible to adjust the temperature of an exothermic peak. The melting temperature of the crystalline resin is, for example, preferably 55° C. or higher and 88° C. or lower, and more preferably 60° C. or higher and 85° C. or lower.

The total amount of heat generated at the exothermic peak according to the condition (1) is more than 0.5 J/g. The total amount of heat generated at the exothermic peak according to condition (1) is, for example, preferably more than 0.5 J/g and 20.0 J/g or less, more preferably 2.0 J/g or more and 15.0 J/g or less, and even more preferably 3.0 J/g or more and 12.0 J/g or less.

The total amount of heat generated at the exothermic peak according to the condition (2) is 0.5 J/g or less. The total amount of heat generated at the exothermic peak according to condition (2) is, for example, preferably 0.0 J/g or more and 0.5 J/g or less, more preferably 0.0 J/g or more and 0.4 J/g or less, and even more preferably 0.0 J/g or more and 0.3 J/g or less.

The difference between the total amount of heat generated at the exothermic peak according to the condition (1) and the total amount of heat generated at the exothermic peak according to the condition (2) is, for example, preferably 0.5 J/g or more and 20.0 J/g or less, more preferably 2.0 J/g or more and 15.0 J/g or less, and even more preferably 3.0 J/g or more and 12.0 J/g or less.

The differential scanning calorimetry (DSC) according to the condition (1) and the condition (2) is performed as follows.

Toner particles in an amount of 8.0 mg±0.5 mg are put in an aluminum sample pan and set in a differential scanning calorimeter. In a nitrogen atmosphere, the thermal process (1) and the thermal process (2) are performed, and thermal analysis is performed on the toner particles.

An exothermic peak is a temperature at which the amount of heat generated is maximized in a range of 30° C. to 70° C. in the DSC curve during the second heating (during the reheating). The amount of heat generated is calculated as follows. First, in the DSC curve of the second heating (reheating), an intersection point between a straight line extended from the base line of the low-temperature region toward the high-temperature side and the DSC curve is determined. At this time, in a case where the intersection point is higher than 70° C. or no intersection point exists, the amount of heat generated is calculated as 0 J/g. In a case where the intersection point is at a temperature equal to or lower than 70° C., the area surrounded by the DSC curve and the baseline is calculated to determine the amount of heat generated.

In a case where the toner has an external additive, the toner is dispersed in water containing a surfactant, treated with ultrasonic waves to remove the external additive, and dried, thereby obtaining toner particles.

In order to satisfy both the condition (1) and condition (2), it is necessary to impose controls such that the state of existence of the crystalline resin in the amorphous resin during the rapid cooling is different from the state of existence of the crystalline resin in the amorphous resin during the slow cooling. That is, presumably, a crystallization peak is likely to appear during the reheating in a case where a high-molecular-weight component in the amorphous resin and the crystalline resin are close to each other, whereas a crystallization peak is unlikely to appear during the reheating in a case where a low-molecular-weight component in the amorphous resin and the crystalline resin are close to each other. Therefore, in order to change the state of existence of the crystalline resin in the amorphous resin according to the cooling rate of the toner particles, it is necessary to control the state of existence such that the crystalline resin is in a state of being close to the high-molecular-weight component in a case where the toner is rapidly cooled and is in a state of being close to the low-molecular-weight component of the amorphous resin in a case where the toner is slowly cooled. In reality, in a case where the toner particles are cooled, the high-molecular-weight component in the amorphous resin is cured first. Presumably, therefore, the low-molecular-weight component and the crystalline resin are likely to be in a state of being close to each other during the slow cooling. Accordingly, it is necessary to impose controls such that the low-molecular-weight component and the crystalline resin are not close to each other during the rapid cooling. By causing the high-molecular-weight component of the amorphous resin and the crystalline resin to be in a state of being close to each other at the stage of toner particles or by increasing the affinity between the high-molecular-weight component of the amorphous resin and the crystalline resin, it is possible to prevent the low-molecular-weight component and the crystalline resin from being close to each other during the rapid cooling. Examples of methods of causing the high-molecular-weight component of the amorphous resin and the crystalline resin to be close to each other at the stage of toner particles include a method of forming particles by using a crystalline resin and a high-molecular-weight amorphous resin and then coating the particles with a low-molecular-weight amorphous resin such that the high-molecular-weight component is unevenly distributed on the inside of the toner, a method of mixing toner particles containing only a low-molecular-weight amorphous resin with toner particles containing a high-molecular-weight amorphous resin and a crystalline resin and using the mixture, a method of chemically bonding a part of a crystalline resin to a part of a high-molecular-weight amorphous resin, and the like. Furthermore, in order to increase the affinity between the high-molecular-weight component of the amorphous resin and the crystalline resin, by changing the type and/or ratio of monomers of a low-molecular-weight component and the high-molecular-weight component, it is possible to adjust the affinity. It is also possible to adjust the affinity by adding highly crosslinked particles to hinder the molecular motion of the crystalline resin.

In the related art, there are toner particles containing a crystal nucleating agent or a crystallization control agent inside to control the crystallization of a binder resin. The toner particles containing a crystal nucleating agent or a crystallization control agent inside are likely to crystallize during the reheating of the thermal process (2). That is, the toner particles containing a crystal nucleating agent or a crystallization control agent inside tend not to satisfy the condition (2). It is preferable that the toner particles of the present exemplary embodiment do not contain, for example, a crystal nucleating agent or a crystallization control agent inside.

Hereinafter, the components, structure, and manufacturing method of the toner according to the present exemplary embodiment will be described.

Toner Particles

The toner particles contain at least a binder resin. The toner particles may contain a colorant, a release agent, and other additives.

Binder Resin

The binder resin contains an amorphous resin and a crystalline resin.

The amorphous resin refers to a resin that does not show a clear endothermic peak but shows a stepwise change in heat absorption in differential scanning calorimetry (DSC). The crystalline resin means a resin having a clear endothermic peak instead of showing a stepwise change in heat absorption in differential scanning calorimetry (DSC).

Specifically, the amorphous resin means a resin which has a half-width of more than 10° C. or a resin for which a clear endothermic peak is not observed, and the crystalline resin means a resin which has a half-width of an endothermic peak of 10° C. or less in a case where the resin is measured at a heating rate of 10° C./min.

The content of the binder resin with respect to the total amount of the toner particles is, for example, preferably 40% by mass or more and 98% by mass or less, more preferably 50% by mass or more and 95% by mass or less, and even more preferably 60% by mass or more and 92% by mass or less.

Amorphous Resin

Examples of the amorphous resin include an amorphous polyester resin, an amorphous vinyl resin (for example, a styrene acrylic resin), an epoxy resin, a polycarbonate resin, a polyurethane resin, and the like. Among these, for example, an amorphous polyester resin and an amorphous vinyl resin (among these, a styrene acrylic resin) are preferable, and an amorphous polyester resin is more preferable.

Amorphous Polyester Resin

Examples of the amorphous polyester resin include a polycondensate of a polyvalent carboxylic acid and a polyhydric alcohol. As the amorphous polyester resin, a commercially available product or a synthetic product may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms).

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One polyvalent carboxylic acid may be used alone, or two or more polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, as the polyhydric alcohol, for example, aromatic diols and alicyclic diols are preferable, and aromatic diols are more preferable.

As the polyhydric alcohol, a polyhydric alcohol having a valency of 3 or more that can form a crosslinked structure or a branched structure may be used in combination with a diol. Examples of the polyhydric alcohol having three or more hydroxyl groups include glycerin, trimethylolpropane, and pentaerythritol.

One polyhydric alcohol may be used alone, or two or more polyhydric alcohols may be used in combination.

The glass transition temperature (Tg) of the amorphous polyester resin is for example, preferably 50° C. or higher and 80° C. or lower, and more preferably 50° C. or higher and 70° C. or lower.

The glass transition temperature of the amorphous polyester resin is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less. The weight-average molecular weight and the number-average molecular weight of the amorphous polyester resin are measured by gel permeation chromatography (GPC). By GPC, the molecular weight is measured using GPC HLC-8120GPC manufactured by Tosoh Corporation as a measurement device, TSKgel Super HM-M (15 cm) manufactured by Tosoh Corporation as a column, and tetrahydrofuran as a solvent. The weight-average molecular weight and the number-average molecular weight are calculated using a molecular weight calibration curve plotted using a monodisperse polystyrene standard sample from the measurement results.

The amorphous polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

Examples of the form of the amorphous polyester resin include an amorphous polyester resin having an aliphatic dicarboxylic acid unit. One aliphatic dicarboxylic acid unit or two or more aliphatic dicarboxylic acid units may be used.

The aliphatic dicarboxylic acid that provides the aliphatic dicarboxylic acid unit may be any of an aliphatic saturated dicarboxylic acid and an aliphatic unsaturated dicarboxylic acid, and is, for example, preferably an aliphatic saturated dicarboxylic acid.

Examples of the aliphatic saturated dicarboxylic acid include linear dicarboxylic acids such as oxalic acid, malonic acid, succinic acid, glutaric acid, adipic acid, pimelic acid, suberic acid, azelaic acid, and sebacic acid; branched dicarboxylic acids such as methyl malonic acid, ethyl malonic acid, dimethyl malonic acid, methyl succinic acid, 2,2-dimethyl succinic acid, 2,3-dimethyl succinic acid, and tetramethyl succinic acid.

Examples of the aliphatic unsaturated dicarboxylic acid include maleic acid, fumaric acid, citraconic acid, itaconic acid, and glutaconic acid.

Examples of the form of the amorphous polyester resin include an amorphous polyester resin having a unit represented by Formula (1). The amorphous polyester resin may have one unit or two or more units represented by Formula (1).

Formula (1)

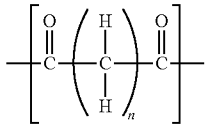

In Formula (1), n is an integer of 4 or more and 12 or less. n is, for example, preferably an integer of 4 or more and 11 or less, more preferably an integer of 4 or more and 10 or less, and even more preferably an integer of 4 or more and 8 or less.

In a case where RL1 represents a mass ratio of the unit represented by Formula (1) to all dicarboxylic acid units in the entire amorphous polyester resin having a molecular weight of 5,000 or less in the amorphous polyester resin, and RH1 represents a mass ratio of the unit represented by Formula (1) to all dicarboxylic acid units in the entire amorphous polyester resin having a molecular weight of 50,000 or more in the amorphous polyester resin, for example, RL1 and RH1 preferably satisfy $0.1 \leq RL1/RH1 \leq 0.8$. The expression means that in the amorphous polyester resin, the high-molecular-weight component (molecular weight of 50,000 or more) contains more units represented by Formula (1) compared to the low-molecular-weight component (molecular weight of 5,000 or less). Presumably, in a case where the above relationship is satisfied, the affinity between the crystalline polyester and the high-molecular-weight component of the amorphous polyester may be improved, and the target structure could be obtained.

In a case where RL1/RH1 is 0.1 or more, the adhesive strength between the image and the laminate film is sufficient during the hot lamination process.

In a case where RL1/RH1 is 0.8 or less, the adhesive strength is unlikely to decrease after the hot lamination process.

In this respect, for example, $0.15 \leq RL1/RH1 \leq 0.75$ is more preferable, and $0.2 \leq RL1/RH1 \leq 0.7$ is even more preferable.

Crystalline Resin

Examples of the crystalline resin include known crystalline resins such as a crystalline polyester resin, a crystalline vinyl resin (for example, a polyalkylene resin, a long-chain alkyl (meth)acrylate resin, and the like), and the like. From the viewpoint of mechanical strength and low temperature fixability of the toner, for example, a crystalline polyester resin is preferable.

Crystalline Polyester Resin

Examples of the crystalline polyester resin include a polycondensate of a polyvalent carboxylic acid and a polyhydric alcohol. As the crystalline polyester resin, a commercially available product or a synthetic product may be used.

From the viewpoint of ease of forming a crystal structure, the crystalline polyester resin is, for example, preferably a polycondensate which uses not a polymerizable monomer having an aromatic ring but a linear aliphatic polymerizable monomer.

Examples of the polyvalent carboxylic acid include aliphatic dicarboxylic acids (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, and the like), aromatic dicarboxylic acids (for example, dibasic acids such as phthalic acid, isophthalic acid, terephthalic acid, and naphthalene-2,6-dicarboxylic acid), anhydrides of these, and lower alkyl esters (for example, having 1 or more and 5 or less carbon atoms) of these.

As the polyvalent carboxylic acid, a carboxylic acid having a valency of 3 or more that has a crosslinked structure or a branched structure may be used in combination with a dicarboxylic acid. Examples of trivalent carboxylic acids include aromatic carboxylic acids (for example, 1,2,3-benzenetricarboxylic acid, 1,2,4-benzenetricarboxylic acid, 1,2,4-naphthalenetricarboxylic acid, and the like), anhydrides of these, and lower alkyl esters (for example, having 1 or more and 5 or less carbon atoms) of these.

As the polyvalent carboxylic acid, a dicarboxylic acid having a sulfonic acid group and a dicarboxylic acid having an ethylenic double bond may be used in combination with dicarboxylic acids.

One polyvalent carboxylic acid may be used alone, or two or more polyvalent carboxylic acids may be used in combination.

Examples of the polyhydric alcohol include an aliphatic diol (for example, a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, and the like. As the aliphatic diol, among these, for example, 1,8-octanediol, 1,9-nonanediol, and 1,10-decanediol are preferable.

As the polyhydric alcohol, an alcohol that has a valency of 3 or more and can form a crosslinked structure or a branched structure may be used in combination with a diol. Examples of the alcohol having three or more hydroxyl groups include glycerin, trimethylolethane, trimethylolpropane, pentaerythritol, and the like.

One polyhydric alcohol may be used alone, or two or more polyhydric alcohols may be used in combination.

It is preferable that the polyhydric alcohol contain, for example, an aliphatic diol. The ratio of the aliphatic diol to the polyhydric alcohol is, for example, preferably 80 mol % or more, and more preferably 90 mol % or more.

The melting temperature of the crystalline polyester resin is, for example, preferably 50° C. or higher and 90° C. or lower, more preferably 55° C. or higher and 88° C. or lower, and even more preferably 60° C. or higher and 85° C. or lower.

The melting temperature of the crystalline polyester resin is determined from a DSC curve obtained by differential scanning calorimetry (DSC) by "peak melting temperature" described in the method for determining the melting temperature in JIS K7121-1987, "Testing methods for transition temperatures of plastics".

The weight-average molecular weight (Mw) of the crystalline polyester resin is, for example, preferably 6,000 or more and 35,000 or less.

Examples of the form of the crystalline polyester resin include a crystalline polyester resin having an aliphatic dicarboxylic acid unit. One aliphatic dicarboxylic acid unit or two or more aliphatic dicarboxylic acid units may be used.

The aliphatic dicarboxylic acid that provides the aliphatic dicarboxylic acid unit may be any of an aliphatic saturated dicarboxylic acid and an aliphatic unsaturated dicarboxylic acid, and is, for example, preferably an aliphatic saturated dicarboxylic acid.

Examples of the aliphatic saturated dicarboxylic acid include linear dicarboxylic acids such as oxalic acid, malonic acid, succinic acid, glutaric acid, adipic acid, pimelic acid, suberic acid, azelaic acid, and sebacic acid; branched dicarboxylic acids such as methyl malonic acid, ethyl malonic acid, dimethyl malonic acid, methyl succinic acid, 2,2-dimethyl succinic acid, 2,3-dimethyl succinic acid, and tetramethyl succinic acid.

Examples of the aliphatic unsaturated dicarboxylic acid include maleic acid, fumaric acid, citraconic acid, itaconic acid, and glutaconic acid.

Examples of the form of the crystalline polyester resin include a crystalline polyester resin having a unit represented by Formula (2). The amorphous polyester resin may have one unit or two or more units represented by Formula (2).

Formula (2)

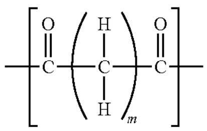

In Formula (2), m is an integer of 4 or more and 12 or less. m is, for example, preferably an integer of 5 or more and 12 or less, more preferably an integer of 6 or more and 11 or less, and even more preferably an integer of 8 or more and 10 or less.

Relationship between Amorphous Resin and Crystalline Resin

From the viewpoint of satisfying both the condition (1) and condition (2), it is preferable that the amorphous resin and the crystalline resin contained in the toner particles be, for example, in the following forms.

From the viewpoint of compatibility between the amorphous resin and the crystalline resin, for example, the amorphous resin preferably contains an amorphous polyester resin, and the crystalline resin preferably contains a crystalline polyester resin.

From the viewpoint of compatibility between the amorphous resin and the crystalline resin, for example, the amorphous polyester resin more preferably contains an amorphous polyester resin having an aliphatic dicarboxylic acid unit, and the crystalline polyester resin more preferably contains a crystalline polyester resin having an aliphatic dicarboxylic acid unit. From the viewpoint of compatibility between the amorphous resin and the crystalline resin, for example, the amorphous polyester resin even more preferably contains an amorphous polyester resin a unit represented by Formula (1), and the crystalline polyester resin even more preferably contains a crystalline polyester resin having a unit represented by Formula (2).

In a case where the amorphous polyester resin in the above form contains an amorphous polyester resin having a unit represented by Formula (1), and the crystalline polyester resin in the above form contains a crystalline polyester resin having a unit represented by Formula (2), for example, n in Formula (1) and m in Formula (2) are preferably different integers. That is, for example, it is preferable that the unit represented by Formula (1) and the unit represented by Formula (2) be different units.

From the viewpoint of compatibility between the amorphous resin and the crystalline resin, the mass ratio of the unit represented by Formula (1) to all dicarboxylic acid units in the entire amorphous polyester resin is, for example, preferably 1% by mass or more and 30% by mass or less, more preferably 1.5% by mass or more and 25% by mass or less, and even more preferably 2% by mass or more and 20% by mass or less.

From the viewpoint of compatibility between the amorphous resin and the crystalline resin, the mass ratio of the unit represented by Formula (2) to all dicarboxylic acid units in the entire crystalline polyester resin is, for example, preferably 60% by mass or more and 100% by mass or less, more preferably 70% by mass or more and 100% by mass or less, and even more preferably 80% by mass or more and 100% by mass or less.

In a case where Wa represents a mass ratio of the amorphous resin contained in the toner particles, We represents a mass ratio of the crystalline resin contained in the toner particles, and $Wc/(Wa+Wc)=W1$, for example, $0.15 \leq W1 \leq 0.50$ is preferable.

In a case where W1 is 0.15 or more, the adhesive strength between the image and the laminate film is sufficient during the hot lamination process.

In a case where W1 is 0.50 or less, the adhesive strength is unlikely to decrease after the hot lamination process.

In this respect, for example, $0.17 \leq W1 \leq 0.45$ is more preferable, and $0.18 \leq W1 \leq 0.40$ is even more preferable.

Furthermore, in a case where WaL represents a mass ratio of the amorphous resin that is contained in a resin having a molecular weight of 5,000 or less contained in the tetrahydrofuran-soluble fraction of the toner particles, WcL represents a mass ratio of the crystalline resin that is contained in a resin having a molecular weight of 5,000 or less contained in the tetrahydrofuran-soluble fraction of the toner particles, and WcL/(WaL+WcL)=W2, for example, $0.1 \leq W2/W1 \leq 0.8$ is preferable. The expression means that in a case where the molecular weight distribution of the crystalline resin is compared with the molecular weight distribution of the amorphous resin, the content of components having a molecular weight of 5,000 or less is relatively higher in the amorphous resin. That is, presumably, adjusting the low molecular weight (molecular weight of 5,000 or less) of the amorphous resin may make it possible to cause the crystalline resin and the low-molecular-weight component of the amorphous resin to be close to each other during slow cooling.

In a case where W2/W1 is 0.1 or more, the adhesive strength is unlikely to decrease after the hot lamination process.

In a case where W2/W1 is 0.8 or less, the adhesive strength between the image and the laminate film is sufficient during the hot lamination process.

In this respect, for example, $0.15 \leq W2/W1 \leq 0.75$ is more preferable, and $0.2 \leq W2/W1 \leq 0.7$ is even more preferable.

In a case where Wap represents a mass ratio of the amorphous polyester resin contained in the toner particles, Wcp represents a mass ratio of the crystalline polyester resin contained in the toner particles, and Wcp/(Waa+Wcp)=W1p, for example, $0.15 \leq W1p \leq 0.50$ is preferable. In a case where W1p is 0.15 or more, the adhesive strength between the image and the laminate film is sufficient during the hot lamination process.

In a case where W1p is 0.50 or less, the adhesive strength is unlikely to decrease after the hot lamination process.

In this respect, for example, $0.17 \leq W1p \leq 0.45$ is more preferable, and $0.18 \leq W1p \leq 0.40$ is even more preferable.

Furthermore, in a case where Wap represents a mass ratio of the amorphous polyester resin contained in a resin having a molecular weight of 5,000 or less contained in the tetrahydrofuran-soluble fraction of the toner particles, Wcp represents a mass ratio of the crystalline polyester resin contained in a resin having a molecular weight of 5,000 or less contained in the tetrahydrofuran-soluble fraction of the toner particles, and WcpL/(WapL+WcpL)=W2p, for example, $0.1 \leq W2p/W1p \leq 0.8$ is preferable.

In a case where W2p/W1p is 0.1 or more, the adhesive strength is unlikely to decrease after the hot lamination process.

In a case where W2p/W1p is 0.8 or less, the adhesive strength between the image and the laminate film is sufficient during the hot lamination process.

In this respect, for example, $0.15 \leq W2p/W1p \leq 0.75$ is more preferable, and $0.2 \leq W2p/W1p \leq 0.7$ is even more preferable.

In a case where R1 represents a mass ratio of the unit represented by Formula (1) to all dicarboxylic acids in the entire amorphous polyester resin, and R2 represents a mass ratio of the unit represented by Formula (2) to all dicarboxylic acid units in the entire crystalline polyester resin, for example, $0.01 \leq R1/R2 \leq 0.40$ is preferable.

In a case where R1/R2 is 0.01 or more, the adhesive strength is unlikely to decrease after the hot lamination process.

In a case where R1/R2 is 0.40 or less, the adhesive strength between the image and the laminate film is sufficient during the hot lamination process.

In this respect, for example, $0.03 \leq R1/R2 \leq 0.35$ is more preferable, and $0.05 \leq R1/R2 \leq 0.30$ is even more preferable.

The molecular weight of the resin contained in the tetrahydrofuran (THF)-soluble fraction of the toner particles is measured by gel permeation chromatography (GPC).

Two "HLC-8120GPC, SC-8020, 6.0 mm ID×15 cm" manufactured by TOSOH CORPORATION, are used, THF is used as an eluent, and an R1 detector is used. The calibration curve is prepared from ten samples of "Polystyrene standard sample TSK standard" manufactured by TOSOH CORPORATION: "A-500", "F-1", "F-10", "F-80", "F-380", "A-2500", "F-4", "F-40", "F-128", and "F-700".

The toner particles (0.5 mg) are added to 1 g of THF, and ultrasonic waves are applied thereto to dissolve the THF-soluble fraction of the toner particles, thereby preparing a sample. GPC is performed at a sample injection volume of 10 μl, a flow rate of 0.6 ml/min, and a measurement temperature of 40° C.

Examples of a method of obtaining toner particles from a toner containing an external additive include the following method.

The toner is added to 0.2% by mass aqueous solution of polyoxyalkylene branched alkyl ether-type nonionic surfactant (trade name: NOIGEN XL-140, DKS Co., Ltd.) such that the toner amount is 10% by mass, and ultrasonic vibration (frequency 20 kHz, output 30 W) is caused in the solution for 60 minutes in a state where solution is kept at a temperature of 30° C. or lower such that an external additive is released from the toner particles. The toner particles are separated by filtration from the dispersion in which the toner particles and the external additive are dispersed, followed by washing, thereby obtaining toner particles.

Resin Particles

The toner particles may contain resin particles.

Examples of the resin configuring the resin particles include a polyolefin (such as polyethylene or polypropylene), a styrene-based resin (such as polystyrene or α-polymethylstyrene), a (meth)acrylic resin (such as polymethyl methacrylate or polyacrylonitrile), a styrene (meth)acrylic resin, an epoxy resin, a polyurethane resin, a polyurea resin, a polyamide resin, a polycarbonate resin, a polyether resin, a polyester resin, and copolymer resins of these. Each of these resins may be used alone, or two or more of these resins may be used in combination.

As the resin configuring the resin particles, for example, a vinyl-based resin such as a polyolefin, a styrene-based resin, a (meth)acrylic resin, or a styrene (meth)acrylic resin is preferable, and a styrene (meth)acrylic resin is more preferable. That is, for example, the resin particles are preferably vinyl-based resin particles, and more preferably styrene (meth)acrylic resin particles.

From the viewpoint of controlling the molecular motion of the crystalline resin, the resin particles are, for example, preferably crosslinked resin particles. The existence of crosslinked resin particles in the toner makes it difficult for the crystalline resin to move to the low-molecular-weight component of the amorphous resin during rapid cooling, and the amount of heat generated can be adjusted.

"Crosslinked resin particles" are resin particles containing a resin having a crosslinked structure between atoms. The crosslinked resin is, for example, a crosslinked product of the above resin.

Examples of the crosslinked resin particles include crosslinked resin particles crosslinked by ionic bonds (ionically crosslinked resin particles), crosslinked resin particles crosslinked by covalent bonds (covalently crosslinked resin particles), and the like. As the crosslinked resin particles, for example, crosslinked resin particles crosslinked by covalent bonds are preferable.

Examples of crosslinking agents for crosslinking the resin include an aromatic polyvinyl compound such as divinylbenzene or divinylnaphthalene; polyvinyl esters of aromatic polyvalent carboxylic acids, such as divinyl phthalate, divinyl isophthalate, divinyl terephthalate, divinyl homophthalate, divinyl trimesate, trivinyl trimesate, divinyl naphthalenedicarboxylate, and divinyl biphenylcarboxylate; divinyl esters of nitrogen-containing aromatic compounds, such as divinyl pyridine dicarboxylate; vinyl esters of unsaturated heterocyclic compound carboxylic acid, such as vinyl pyromucate, vinyl furan carboxylate, vinyl pyrrole-2-carboxylate, and vinyl thiophene carboxylate; (meth)acrylic acid esters of linear polyhydric alcohols, such butanediol di(meth)acrylate, hexanediol di(meth)acrylate, octanediol di(meth)acrylate, nonanediol di(meth)acrylate, decanediol di(meth)acrylate, and dodecanediol di(meth)acrylate; (meth) acrylic acid esters of branched substituted polyhydric alcohols, such as neopentylglycol dimethacrylate and 2-hydroxy-1,3-diacryloxypropane; polyvinyl esters of polyvalent carboxylic acids, such as polyethylene glycol di(meth)acrylate, polypropylene polyethylene glycol di(meth)acrylates, divinyl succinate, divinyl fumarate, vinyl maleate, divinyl maleate, divinyl diglycolate, vinyl itaconate, divinyl itaconate, divinyl acetone dicarboxylate, divinyl glutarate, 3,3'-divinylthiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate, and the like. One crosslinking agent may be used alone, or two or more crosslinking agents may be used in combination.

As the crosslinking agent for crosslinking the resin, for example, a polyfunctional (meth)acrylate is preferable, a difunctional (meth)acrylate is more preferable, and at least one difunctional (meth)acrylate selected from the group consisting of a compound represented by the following Formula (A), a compound represented by the following Formula (B), and a compound represented by the following Formula (C) is even more preferable. That is, it is preferable that the crosslinked resin have, for example, a crosslinked structure derived from at least one difunctional (meth) acrylate selected from the group consisting of a compound represented by the following Formula (A), a compound represented by the following Formula (B), and a compound represented by the following Formula (C).

Formula (A)

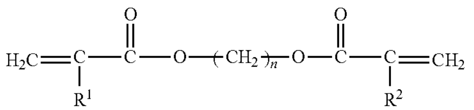

Formula (B)

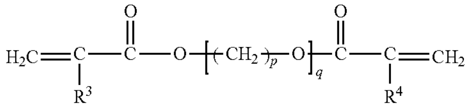

-continued

Formula (C)

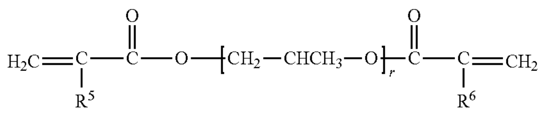

In Formula (A), $R^1$ and $R^2$ each independently represent a hydrogen atom or a methyl group, and n is an integer of 4 or more and 20 or less.

In Formula (B), $R^3$ and $R^4$ each independently represent a hydrogen atom or a methyl group, p is an integer of 2 or more and 4 or less, and q is an integer of 2 or more and 20 or less.

In Formula (C), $R^5$ and $R^6$ each independently represent a hydrogen atom or a methyl group, and r is an integer of 2 or more and 20 or less.

In in Formula (A) is an integer of 4 or more and 20 or less. n in Formula (A) is, for example, preferably an integer of 4 or more and 18 or less, more preferably an integer of 4 or more and 16 or less, and even more preferably an integer of 6 or more and 14 or less.

From the viewpoint of appropriately increasing the distance between crosslinking points (that is, from the viewpoint of appropriately lowering the crosslinking density), for example, n is preferably in the above range.

In Formula (B), p is an integer of 2 or more and 4 or less. q in Formula (B) is an integer of 2 or more and 20 or less. q in Formula (B) is, for example, preferably an integer of 3 or more and 18 or less, more preferably an integer of 3 or more and 16 or less, and even more preferably an integer of 4 or more and 14 or less.

From the viewpoint of appropriately increasing the distance between crosslinking points (that is, from the viewpoint of appropriately lowering the crosslinking density), for example, each of p and q is preferably in the above range.

In Formula (C), r is an integer of 2 or more and 20 or less. r is, for example, preferably an integer of 2 or more and 18 or less, and more preferably an integer of 3 or more and 16 or less.

From the viewpoint of appropriately increasing the distance between crosslinking points (that is, from the viewpoint of appropriately lowering the crosslinking density), for example, r is preferably in the above range.

Examples of the compound represented by Formula (A) include 1,4-butanediol di(meth)acrylate, 1,5-pentanediol di(meth)acrylate, 1,6-hexanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, 1,14-tetradecanediol di(meth)acrylate, 1,16-hexadecanediol di(meth)acrylate, and the like.

Examples of the compound represented by Formula (B) include diethylene glycol di(meth)acrylate, triethylene glycol di(meth)acrylate, tetraethylene glycol di(meth)acrylate, polyethylene glycol di(meth)acrylate, polytetramethylene glycol di(meth)acrylate, and the like.

Examples of the compound represented by Formula (C) include dipropylene glycol di(meth)acrylate, tripropylene glycol di(meth)acrylate, polypropylene glycol di(meth)acrylate, and the like.

As the crosslinked resin particles, from the viewpoint of having appropriate viscoelasticity, for example, crosslinked vinyl-based resin particles configured with a crosslinked product of a vinyl-based resin are preferable. As the crosslinked vinyl-based resin, for example, a crosslinked product of a styrene (meth)acrylic resin is preferable. That is, as the crosslinked resin particles, for example, crosslinked styrene (meth)acrylic resin particles are more preferable.

Examples of the styrene(meth)acrylic resin include resins obtained by polymerizing the following styrene-based monomer and (meth)acrylic acid-based monomer by radical polymerization.

Examples of the styrene-based monomer include styrene, α-methylstyrene, vinylnaphthalene; alkyl-substituted styrene such as 2-methylstyrene, 3-methylstyrene, 4-methylstyrene, 2-ethylstyrene, 3-ethylstyrene, and 4-ethylstyrene; halogen-substituted styrene such as 2-chlorostyrene, 3-chlorostyrene, and 4-chlorostyrene; fluorine-substituted styrene such as 4-fluorostyrene and 2,5-difluorostyrene, and the like. As the styrene-based monomer, for example, styrene and α-methylstyrene are preferable. One styrene-based monomer may be used alone, or two or more styrene-based monomers may be used in combination.

Examples of the (meth)acrylic acid-based monomer include (meth)acrylic acid, methyl (meth)acrylate, ethyl (meth)acrylate, n-propyl (meth)acrylate, n-butyl (meth) acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth) acrylate, n-tetradecyl (meth)acrylate, n-hexadecyl (meth) acrylate, n-octadecyl (meth)acrylate, isopropyl (meth)acrylate, isobutyl (meth)acrylate, t-butyl (meth)acrylate, isopentyl (meth)acrylate, neopentyl (meth)acrylate, isohexyl (meth)acrylate, isopentyl (meth)acrylate, isooctyl (meth) acrylate, 2-ethylhexyl (meth)acrylate, phenyl (meth)acrylate, biphenyl (meth)acrylate, diphenyl ethyl (meth)acrylate, t-butylphenyl (meth)acrylate, terphenyl (meth)acrylate, cyclohexyl (meth)acrylate, t-butylcyclohexyl (meth)acrylate, dimethylaminoethyl (meth)acrylate, diethylaminoethyl (meth)acrylate, methoxyethyl (meth)acrylate, 2-hydroxyethyl (meth)acrylate, 2-carboxyethyl (meth)acrylate, 2-carboxypropyl (meth)acrylate, 3-carboxypropyl (meth)acrylate, 4-carboxybutyl (meth)acrylate, (meth)acrylonitrile, (meth)acrylamide, and the like. One (meth)acrylic acid-based monomer may be used alone, or two or more (meth) acrylic acid-based monomers may be used in combination.

As the (meth)acrylic acid-based monomer, for example, a (meth)acrylic acid lower alkyl ester is preferable. In the (meth)acrylic acid lower alkyl ester, "lower alkyl" means an alkyl having 1 or more and 5 or less carbon atoms. "Lower alkyl" is, for example, preferably an alkyl having 2 or more and 4 or less carbon atoms, and more preferably an alkyl having 3 or 4 carbon atoms.

Examples of the (meth)acrylic acid lower alkyl ester include methyl (meth)acrylate, ethyl (meth)acrylate, n-propyl (meth)acrylate, n-butyl (meth)acrylate, n-pentyl (meth) acrylate, isopropyl (meth)acrylate, isobutyl (meth)acrylate, t-butyl (meth)acrylate, isopentyl (meth)acrylate, neopentyl (meth)acrylate, and the like. Among these, for example, ethyl (meth)acrylate, n-propyl (meth)acrylate, and n-butyl (meth)acrylate are preferable, and n-butyl (meth)acrylate is particularly preferable.

The polymerization ratio between the styrene-based monomer and the (meth)acrylic acid-based monomer (styrene-based monomer:(meth)acrylic acid-based monomer based on mass) is, for example, preferably 5:95 to 90:10, more preferably 10:90 to 85:15, and even more preferably 20:80 to 80:20.

As the crosslinking agent configuring the crosslinked styrene(meth)acrylic resin, for example, a polyfunctional (meth)acrylate is preferable, a difunctional (meth)acrylate is more preferable, and at least one difunctional (meth)acrylate selected from the group consisting of a compound represented by Formula (A) and a compound represented by Formula (B) is even more preferable. That is, it is preferable that the crosslinked styrene (meth)acrylic resin have, for example, a crosslinked structure derived from at least one difunctional (meth)acrylate selected from the group consisting of a compound represented by Formula (A) and a compound represented by Formula (B).

The average particle size of the crosslinked resin particles is, for example, preferably 50 nm or more and 800 nm or less, more preferably 60 nm or more and 500 nm or less, and even more preferably 65 nm or more and 350 nm or less.

The average particle size of the crosslinked resin particles is measured by the following method.

The toner is mixed with and embedded in an epoxy resin, and the epoxy resin is solidified. A thin sample having a thickness of 80 nm or more and 130 nm or less is prepared using an ultramicrotome device. The thin sample is stained with osmium tetroxide in a desiccator at 30° C. for 3 hours. An SEM image of the stained thin sample is captured with an ultra-high resolution field-emission scanning electron microscope (S-4800, Hitachi High-Tech Corporation.). Each component is identified based on the light and shade resulting from the degree of staining. In a case where it is difficult to distinguish the light and shade due to the condition of the sample or the like, the staining time is adjusted.

The SEM image is analyzed with the image analysis software WinRoof (MITANI CORPORATION). Within the SEM image, cross sections of toner particles having a long diameter that is equal to or more than 85% of the volume-average particle size of the toner particles are selected, and the crosslinked resin particles are observed. The circular equivalent diameter of the crosslinked resin particles is adopted as the particle size of the crosslinked resin particles. For the plurality of toner particles, the particle sizes of 300 crosslinked resin particles are measured, and the arithmetic mean thereof is adopted as an average particle size (nm). The volume-average particle size of the toner particles is measured by the method that will be described later.

The mass ratio of the crosslinked resin particles to the toner particles is, for example, preferably 1% by mass or more and 30% by mass or less.

In a case where the mass ratio of the crosslinked resin particles is 1% by mass or more, the adhesive strength between the image and the laminate film is sufficient during the hot lamination process.

In a case where the mass ratio of the crosslinked resin particles is 30% by mass or less, the adhesive strength is unlikely to decrease after the hot lamination process.

In this respect, the mass ratio of the crosslinked resin particles is, for example, more preferably 2% by mass or more and 25% by mass or less, and even more preferably 3% by mass or more and 20% by mass or less.

Colorant

Examples of colorants include pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and inorganic pigments such as a titanium compound and silica.

The colorant is not limited to a substance having absorption in the visible light region. The colorant may be, for example, a substance having absorption in a near-infrared region or a fluorescent colorant.

Examples of the colorant having absorption in the near-infrared region include an aminium salt-based compound, a naphthalocyanine-based compound, a squarylium-based compound, a croconium-based compound, and the like.

Examples of the fluorescent colorant include the fluorescent colorants described in paragraph "0027" of JP2021-127431A.

The colorant may be a luminous colorant. Examples of the luminous colorant include metal powder such as aluminum, brass, bronze, nickel, stainless steel, or zinc; mica coated with titanium oxide or yellow iron oxide; a coated flaky inorganic crystal substrate such as barium sulfate, layered silicate, or silicate of layered aluminum; monocrystal plate-shaped titanium oxide, basic carbonate, bismuth oxychloride, natural guanine, flaky glass powder, metal-deposited flaky glass powder; and the like.

One colorant may be used alone, or two or more colorants may be used in combination.

As the colorant, a colorant having undergone a surface treatment as necessary may be used, or a dispersant may be used in combination with the colorant.

In the present exemplary embodiment, the toner particles may or may not contain a colorant. The toner according to the present exemplary embodiment may be a so-called transparent toner which is a toner having toner particles that do not contain a colorant.

In a case where the toner particles of the present exemplary embodiment contain a colorant, the content of the colorant with respect to the total amount of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower. The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total mass of the toner particles is, for example, preferably 1% by mass or more and 20% by mass or less, and more preferably 5% by mass or more and 15% by mass or less.

In a case where Wcp represents a content of the crystalline polyester resin contained in the toner particles, and Ww represents a content of the release agent contained in the toner particles, for example, $1.5 \leq Wcp/Ww \leq 5.0$ is preferable.

In a case where Wcp/Ww is 1.5 or more, the adhesive strength between the image and the laminate film is sufficient during the hot lamination process.

In a case where Wcp/Ww is 5.0 or less, the adhesive strength is unlikely to decrease after the hot lamination process.

In this respect, for example, $1.7 \leq Wcp/Ww \leq 4.5$ is more preferable, and $1.8 \leq Wcp/Ww \leq 4.2$ is even more preferable.

Other Additives

Examples of other additives include known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion. The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less. The volume-average particle size (D50v) of the toner particles is measured using COULTER MULTISIZER II (manufactured by Beckman Coulter, Inc.) and using ISOTON-II (manufactured by Beckman Coulter, Inc.) as an electrolytic solution. For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to an electrolytic solution in a volume of 100 ml or more and 150 ml or less. The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 m. The number of particles to be sampled is 50,000.

The average circularity of the toner particles is, for example, preferably 0.94 or more and 1.00 or less, and more preferably 0.95 or more and 0.98 or less.

The average circularity of the toner particles is determined by (circular equivalent perimeter)/(perimeter) [(perimeter of circle having the same projected area as particle image)/(perimeter of projected particle image)]. Specifically, the average circularity is a value measured by the following method.

Toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

External Additive

Examples of the external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, CaO $SiO_2$, $K_2O\cdot(TiO_2)_n$, $Al_2O_3\cdot 2SiO_2$, $CaCO_3$, $MgCO_3$, $BaSO_4$, $MgSO_4$, and the like.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, an aluminum-based coupling agent, and the like. Each of these agents may be used alone, or two or more of these agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

As an external additive, for example, inorganic particles are preferable. The inorganic particles have an action of facilitating crystallization of the crystalline resin contained in the image during the hot lamination process.

From the viewpoint of facilitating crystallization of the crystalline resin during the hot lamination process by existing on the surface of the image, for example, it is preferable that the inorganic particles have a particle size which makes it difficult for the inorganic particles to be buried in the toner particles and allows the inorganic particles to move to a recording medium. In this respect, the average particle size of the inorganic particles is, for example, preferably 50 nm or more and 300 nm or less, more preferably 55 nm or more and 250 nm or less, and even more preferably 60 nm or more and 200 nm or less. In a case where two or more kinds of inorganic particles are used, for example, it is preferable that at least one kind of inorganic particles have an average particle size satisfying the above range.

The amount of the inorganic particles added to the exterior of the toner particles with respect to 100 parts by mass of the toner particles is, for example, preferably 0.1 parts by mass or more and 8.0 parts by mass or less, more preferably 0.5 parts by mass or more and 7.0 parts by mass or less, and even more preferably 1.0 part by mass or more and 6.0 parts by mass or less.

As an external additive, for example, silica particles are more preferable.

The silica particles may be dry silica or wet silica.

Examples of the dry silica include silica by a combustion method (fumed silica) obtained by combustion of a silane compound and silica by a deflagration method obtained by explosive combustion of metallic silicon powder.

Examples of the wet silica include wet silica obtained by a neutralization reaction between sodium silicate and a mineral acid (silica by a precipitation method synthesized/aggregated under alkaline conditions, silica by a gelation method synthesized/aggregated under acidic conditions), colloidal silica obtained by alkalifying and polymerizing acidic silicate, and sol-gel silica obtained by the hydrolysis of an organic silane compound (for example, alkoxysilane).

As the silica particles, from the viewpoint of a relatively higher circularity, for example, sol-gel silica is preferable.

For example, it is preferable that the surface of the silica particles have undergone a hydrophobic treatment. The hydrophobic agent is not particularly limited, and examples thereof include a silane-based coupling agent, silicone oil, a silazane compound, and the like.

From the viewpoint of facilitating crystallization of the crystalline resin during the hot lamination process by existing on the surface of the image, for example, it is preferable that the silica particles have a particle size which makes it difficult for the silica particles to be buried in the toner particles and allows the silica particles to move to a recording medium. In this respect, the average particle size of the silica particles is, for example, preferably 50 nm or more and 300 nm or less, more preferably 55 nm or more and 250 nm or less, and even more preferably 60 nm or more and 200 nm or less.

The amount of the silica particles added to the exterior of the toner particles with respect to 100 parts by mass of the toner particles is, for example, preferably 0.1 parts by mass or more and 8.0 parts by mass or less, more preferably 0.5 parts by mass or more and 7.0 parts by mass or less, and even more preferably 1.0 part by mass or more and 6.0 parts by mass or less.

Manufacturing Method of Toner

The toner according to the present exemplary embodiment is obtained by manufacturing toner particles and then adding external additives to the exterior of the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no restrictions on these manufacturing methods, and known manufacturing methods are adopted. Among the above methods, for example, the aggregation and coalescence method may be used for obtaining toner particles.

Specifically, for example, in a case where the toner particles are manufactured by the aggregation and coalescence method, the toner particles are manufactured through a step of preparing an amorphous resin particle dispersion in which amorphous resin particles are dispersed, a crystalline resin particle dispersion in which crystalline resin particles are dispersed, and a crosslinked resin particle dispersion in which crosslinked resin particles are dispersed (resin particle dispersion-preparing step), a step of forming aggregated particles by aggregating the amorphous resin particles, the crystalline resin particles, and the crosslinked resin particles (and other particles as necessary) in a dispersion obtained by mixing together the amorphous resin particle dispersion, the crystalline resin particle dispersion, and the crosslinked resin particle dispersion (a dispersion obtained after other particle dispersions are mixed in as necessary) (aggregated particle-forming step), and a step of coalescing the aggregated particles by heating an aggregated particle dispersion containing the aggregated particle dispersed to form toner particles (coalescence step).

Hereinafter, each of the steps will be specifically described.

In the following section, a method of obtaining toner particles containing a colorant and a release agent will be described. The colorant and the release agent are used as necessary. It goes without saying that other additives different from the colorant and the release agent may also be used.

Resin Particle Dispersion-Preparing Step

The amorphous resin particle dispersion is prepared, for example, by dispersing the amorphous resin particles in a dispersion medium by using a surfactant. The crystalline resin particle dispersion is prepared, for example, by dispersing the crystalline resin particles in a dispersion medium by using a surfactant.

Examples of the dispersion medium used for the resin particle dispersion include an aqueous medium.

Examples of the aqueous medium include distilled water, water such as deionized water, alcohols, and the like. Each of these media may be used alone, or two or more of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant. One surfactant may be used alone, or two or more surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 μm or less, more preferably 0.04 m or more and 0.8 μm or less, and even more preferably 0.06 μm or more and 0.6 μm or less. For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

As means for satisfying both the condition (1) and condition (2), for example, it is preferable to prepare two or more amorphous resin particle dispersions.

For example, two amorphous resin particle dispersions having amorphous resins with different weight-average molecular weights, two amorphous resin particle dispersions having different types of monomers configuring amorphous resins, and two amorphous resin particle dispersions having resin particles with different average particle sizes are prepared.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

As a method of preparing the crosslinked resin particle dispersion, for example, known methods such as an emulsion polymerization method, a melt kneading method using a Banbury mixer or a kneader, a suspension polymerization method, and a spray drying method are used. Among these, for example, an emulsion polymerization method is preferable. It is preferable that the emulsification polymerization be performed, for example, in a plurality of times.

The method of preparing the crosslinked resin particle dispersion preferably includes, for example,

- a step of obtaining an emulsion containing a monomer, a crosslinking agent, a surfactant, and water (emulsion-preparing step),
- a step of adding a polymerization initiator to the emulsion and then heating the emulsion to polymerize the monomer (first emulsion polymerization step), and
- a step of adding an emulsion containing a monomer and a crosslinking agent to a reaction solution obtained after the first emulsion polymerization step and then heating the solution to polymerize the monomer (second emulsion polymerization step).

Emulsion-Preparing Step

For example, it is preferable to obtain the emulsion by emulsifying a monomer, a crosslinking agent, a surfactant, and water by using an emulsifying machine. Examples of the emulsifying machine include a rotary stirrer equipped with a propeller type, anchor type, paddle type, or turbine type stirring blade, a stationary mixer such as a static mixer, and a rotor/stator type emulsifying machine such as a homogenizer or Clare mix, a mill type emulsifying machine having grinding function, a high-pressure emulsifying machine such as a Manton Gaulin-type pressure emulsifying machine, a high-pressure nozzle type emulsifying machine that causes cavitation under high pressure, a high-pressure impact-type emulsifying machine, such as a microfluidizer, which generates shearing force by causing collision of liquids under high pressure, an ultrasonic emulsifying machine that causes cavitation by using ultrasonic waves, a membrane emulsifying machine that performs uniform emulsification through pores, and the like.

As the monomer, for example, it is preferable to use a styrene-based monomer and a (meth)acrylic acid-based monomer. As the crosslinking agent, for example, a polyfunctional (meth)acrylate is preferable, a difunctional (meth)acrylate is more preferable, and at least one difunctional (meth)acrylate selected from the group consisting of a compound represented by Formula (A) and a compound represented by Formula (B) is even more preferable.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. The nonionic surfactant may be used in combination with an anionic surfactant or a cationic surfactant. Among these, an anionic surfactant is preferable, for example. One surfactant may be used alone, or two or more surfactants may be used in combination.

The emulsion may contain a chain transfer agent. Examples of the chain transfer agent include compounds having a thiol component. Specifically, for example, alkyl mercaptans such as hexyl mercaptan, heptyl mercaptan, octyl mercaptan, nonyl mercaptan, decyl mercaptan, and dodecyl mercaptan are preferable.

First Emulsion Polymerization Step

This is a step of adding a polymerization initiator to the emulsion and then heating the emulsion to polymerize the monomer.

As the polymerization initiator, for example, it is preferable to use ammonium persulfate.

In polymerizing the monomer, for example, it is preferable to stir the emulsion (reaction solution) containing the polymerization initiator with a stirrer. Examples of the stirrer include a rotary stirrer equipped with a propeller type, anchor type, paddle type, or turbine type stirring blade.

Second Emulsion Polymerization Step

This is a step of adding an emulsion containing a monomer to the reaction solution obtained after the first emulsion polymerization step and then heating the reaction solution to polymerize the monomer. The emulsion to be added is preferably obtained, for example, by emulsifying the monomer, the surfactant, and water with an emulsifying machine. In polymerizing the monomers, for example, it is preferable to stir the reaction solution as in the first emulsion polymerization step.

Aggregated Particle-Forming Step

The amorphous resin particle dispersion, the crystalline resin particle dispersion, the crosslinked resin particle dispersion, the colorant particle dispersion, and the release agent particle dispersion are mixed together. Then, in the mixed dispersion, the amorphous resin particles, the crystalline resin particles, the crosslinked resin particles, the colorant particles, and the release agent particles are heteroaggregated such that aggregated particles having a diameter close to the diameter of the target toner particles are formed.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the amorphous resin particles (specifically, for example, to a temperature equal to or higher than the glass transition temperature of the amorphous resin particles −30° C. and equal to or lower than the glass transition temperature of the amorphous resin particles −10° C.) such that the particles dispersed in the mixed dispersion are aggregated, thereby forming aggregated particles. In the aggregated particle-forming step, for example, in a state where the mixed dispersion is being stirred with a rotary shearing homogenizer, an aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

In a case where two or more amorphous resin particle dispersions are used, for example, either or both of the mixing order and the ratio of mixing amounts of the dispersions may be adjusted such that condition (1) and condition (2) can be satisfied.

The temperature of the mixed dispersion to which the aggregating agent is added may be adjusted such that the dispersion state of the crosslinked resin particles in the obtained toner particles is controlled. For example, reducing the temperature of the mixed dispersion enables the crosslinked resin particles to exhibit excellent dispersibility. The temperature of the mixed dispersion is, for example, in a range of 5° C. or higher and 40° C. or lower.

The stirring rate after the addition of the aggregating agent may be adjusted such that the dispersion state of the crosslinked resin particles in the obtained toner particles is controlled. For example, increasing the stirring rate after the addition of the aggregating agent enables the crosslinked resin particles to exhibit excellent dispersibility.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the amorphous resin particles (for example, a temperature 10° C. to 30° C. higher than the glass transition temperature of the amorphous resin particles) such that the aggregated particles coalesce, thereby forming toner particles.

Toner particles are obtained through the above steps.

The toner particles may be manufactured through a step of obtaining second aggregated particles by mixing the amorphous resin particle dispersion with the aggregated particle dispersion after the aggregated particle dispersion is obtained and aggregating the particles such that amorphous resin particles adhere to the surface of the aggregated particles, and a step of forming toner particles having a core/shell structure by heating a second aggregated particle dispersion in which the second aggregated particles are dispersed such that the second aggregated particles coalesce.

In a case where two or more amorphous resin particle dispersions are used in the step of forming the second aggregated particles, for example, either or both of the mixing order and the ratio of mixing amounts of the dispersions may be adjusted such that condition (1) and condition (2) can be satisfied.

After the coalescence step ends, the toner particles in the dispersion are subjected to known washing step, solid-liquid separation step, and drying step, thereby obtaining dry toner particles. As the washing step, from the viewpoint of charging properties, for example, displacement washing may be thoroughly performed using deionized water. As the solid-liquid separation step, from the viewpoint of productivity, for example, suction filtration, pressure filtration, or the like may be performed. As the drying step, from the viewpoint of productivity, for example, freeze-drying, flush drying, fluidized drying, vibratory fluidized drying, or the like may be performed.

Then, for example, by adding an external additive to the obtained dry toner particles and mixing together the external additive and the toner particles, the toner according to the present exemplary embodiment is manufactured. The mixing may be performed, for example, using a V blender, a Henschel mixer, a Lödige mixer, or the like. As necessary, coarse particles of the toner may be removed using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin and; a resin impregnation-type carrier obtained by impregnating porous magnetic powder with a resin; and the like.

Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the toner and the carrier, represented by toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In a case where the image forming apparatus according to the present exemplary embodiment is the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is preferably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that prints out images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are detachable from the image forming apparatus.

An intermediate transfer belt (an example of an intermediate transfer member) 20 passing through the units 10Y, 10M, 10C, and 10K extends above the units. The intermediate transfer belt 20 is looped around a driving roll 22 and a support roll 24, and runs toward a fourth unit 10K from a first unit 10Y Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the side of the image holding surface of the intermediate transfer belt 20.

Toners of yellow, magenta, cyan, and black, stored in containers of toner cartridges 8Y, 8M, 8C, and 8K are supplied to developing devices (an example of developing units) 4Y, 4M, 4C, and 4K of units 10Y, 10M, 10C, and 10K, respectively.

The first to fourth units 10Y, 10M, 10C, and 10K have the same configuration and perform the same operation. Therefore, in the present specification, as a representative, the first unit 10Y will be described which is placed on the upstream side of the running direction of the intermediate transfer belt and forms a yellow image.

The first unit 10Y has a photoreceptor 1Y that acts as an image holder. Around the photoreceptor 1Y, a charging roll 2Y (an example of charging unit) that charges the surface of the photoreceptor 1Y at a predetermined potential, an exposure device 3 (an example of electrostatic charge image forming unit) that exposes the charged surface to a laser beam 3Y based on color-separated image signals to form an electrostatic charge image, a developing device 4Y (an example of developing unit) that develops the electrostatic charge image by supplying a charged toner to the electrostatic charge image, a primary transfer roll 5Y (an example of primary transfer unit) that transfers the developed toner image onto the intermediate transfer belt 20, and a photoreceptor cleaning device 6Y (an example of cleaning unit) that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y A bias power supply (not shown in the drawing) for applying a primary transfer bias is connected to primary transfer rolls 5Y, 5M, 5C, and 5K of each unit. Each bias power supply changes the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y The photoreceptor 1Y is formed of a photosensitive layer laminated on a conductive (for example, volume resistivity at 20° C.: $1\times10^{-6}\Omega\cdot$cm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 3, the laser beam 3Y is radiated to the surface of the charged photoreceptor 1Y according to the image data for yellow transmitted from the control unit not shown in the drawing. As a result, an electrostatic charge image of the yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y rotates to a predetermined development position as the photoreceptor 1Y runs. At the development position, the electrostatic charge image on the photoreceptor 1Y is developed as a toner image by the developing device 4Y and visualized.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown in the drawing).

The residual toner on the photoreceptor 1Y is removed by a photoreceptor cleaning device 6Y and collected.

The primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of a secondary transfer unit) disposed on the side of the image holding surface of the intermediate transfer belt 20. Meanwhile, via a supply mechanism, recording paper P (an example of a recording medium) is fed at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Then, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are preferably used.

The recording paper P on which the color image has been fixed is transported to an output portion, and a series of color image forming operations is finished.

Process Cartridge and Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
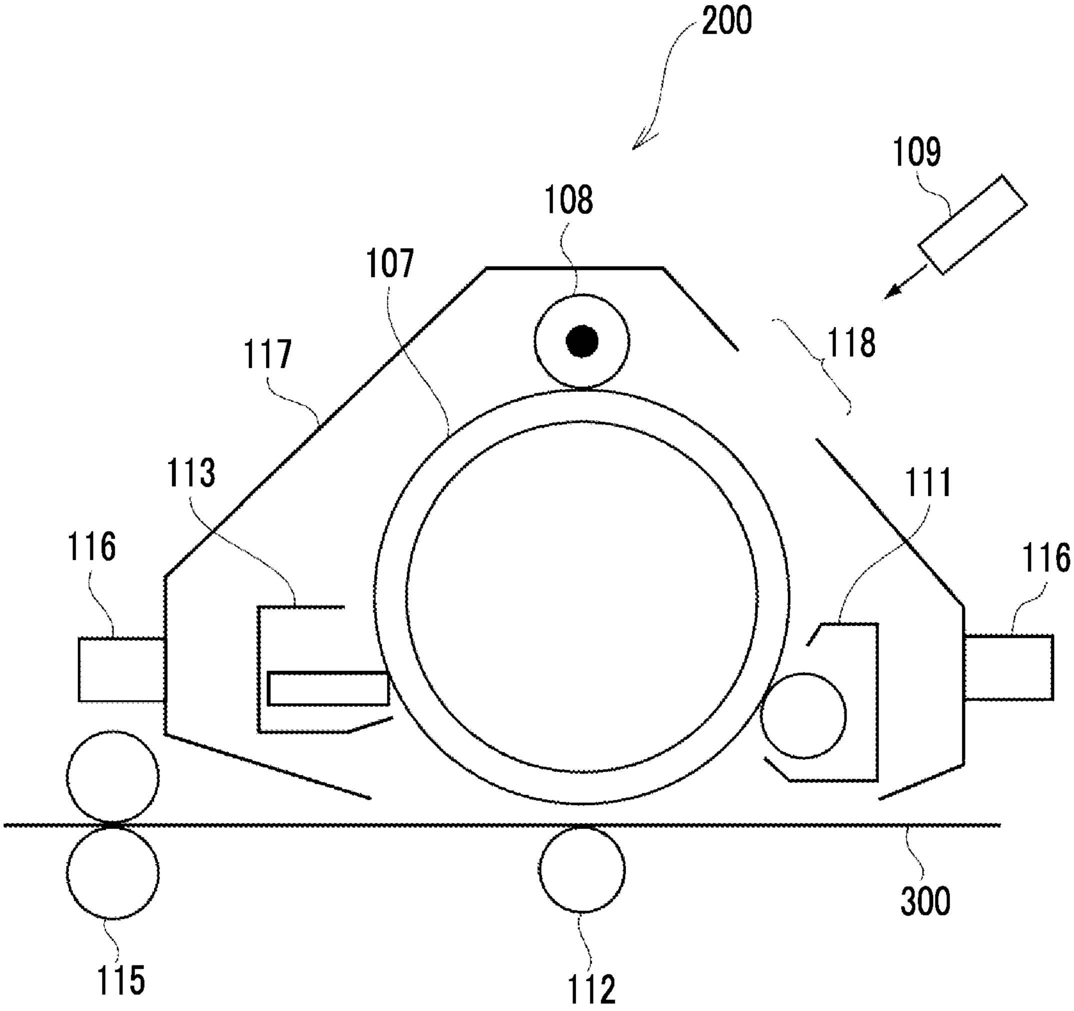
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a transfer device (an example of a transfer unit), 115 represents a fixing device (an example of a fixing unit), and 300 represents recording paper (an example of a recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Preparation of Amorphous Polyester Resin Particle Dispersion (1-1)

Terephthalic acid: 49 parts by mol
Adipic acid: 1 part by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-1) is cooled.

The molten reactant (1-1) is transferred as it is to CAVITRON CD1010 (manufactured by Eurotech Ltd.) at a rate of 100 g/min. At the same time, separately prepared 0.37% aqueous ammonia solution is transferred to CAVITRON CD1010 at a rate of 0.1 L/min in a state of being heated at 120° C. with a heat exchanger. CAVITRON CD1010 is operated under the conditions of a rotation speed of a rotor of 60 Hz and a pressure of 5 $kg/cm^2$, thereby obtaining a resin particle dispersion. Deionized water is added to the resin particle dispersion, thereby obtaining an amorphous polyester resin particle dispersion (1-1) having a solid content of 20%. In the amorphous polyester resin particle dispersion (1-1), the volume-average particle size of the resin particles is 160 nm, and the weight-average molecular weight of the amorphous polyester resin is 14,000.

Preparation of Amorphous Polyester Resin Particle Dispersion (1-2)

Terephthalic acid: 21 parts by mol
Isophthalic acid: 25 parts by mol
Adipic acid: 4 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 2.5 hours in the reaction solution kept at 240° C., and then a reactant (1-2) is cooled.

In the same manner as in the preparation of the amorphous polyester resin particle dispersion (1-1), an amorphous polyester resin particle dispersion (1-2) having a solid content of 20% is obtained using the reactant (1-2). In the amorphous polyester resin particle dispersion (1-2), the volume-average particle size of the resin particles is 160 nm, and the weight-average molecular weight of the amorphous polyester resin is 9,000.

Preparation of Amorphous Polyester Resin Particle Dispersion (1-3)

Terephthalic acid: 48 parts by mol
Sebacic acid: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-3) is cooled.

In the same manner as in the preparation of the amorphous polyester resin particle dispersion (1-1), an amorphous polyester resin particle dispersion (1-3) having a solid content of 20% is obtained using the reactant (1-3). In the amorphous polyester resin particle dispersion (1-3), the volume-average particle size of the resin particles is 160 nm, and the weight-average molecular weight of the amorphous polyester resin is 11,000.

Preparation of Amorphous Polyester Resin Particle Dispersion (1-4)

An amorphous polyester resin particle dispersion (1-4) having a solid content of 20% is obtained in the same manner as in the preparation of the amorphous polyester resin particle dispersion (1-1), except that the temperature of the dehydration condensation reaction is changed to 230° C. from 240° C. In the amorphous polyester resin particle dispersion (1-4), the volume-average particle size of the resin particles is 150 nm, and the weight-average molecular weight of the amorphous polyester resin is 7,800.

Preparation of Amorphous Polyester Resin Particle Dispersion (1-5)

Terephthalic acid: 48 parts by mol
Sebacic acid: 1 part by mol
Trimellitic anhydride: 1 part by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3.5 hours in the reaction solution kept at 240° C., and then a reactant (1-5) is cooled.

In the same manner as in the preparation of the amorphous polyester resin particle dispersion (1-1), an amorphous polyester resin particle dispersion (1-5) having a solid content of 20% is obtained using the reactant (1-5). In the amorphous polyester resin particle dispersion (1-5), the volume-average particle size of the resin particles is 170 nm, and the weight-average molecular weight of the amorphous polyester resin is 18,500.

Preparation of Amorphous Polyester Resin Particle Dispersion (1-6)

Terephthalic acid: 30 parts by mol
Isophthalic acid: 19.5 parts by mol
Suberic acid: 0.5 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-6) is cooled.

In the same manner as in the preparation of the amorphous polyester resin particle dispersion (1-1), an amorphous polyester resin particle dispersion (1-6) having a solid content of 20% is obtained using the reactant (1-6). In the amorphous polyester resin particle dispersion (1-6), the volume-average particle size of the resin particles is 160 nm, and the weight-average molecular weight of the amorphous polyester resin is 13,000.

Preparation of Amorphous Polyester Resin Particle Dispersion (1-7)

Terephthalic acid: 45 parts by mol
Suberic acid: 5 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-7) is cooled.

In the same manner as in the preparation of the amorphous polyester resin particle dispersion (1-1), an amorphous polyester resin particle dispersion (1-7) having a solid content of 20% is obtained using the reactant (1-7). In the amorphous polyester resin particle dispersion (1-7), the volume-average particle size of the resin particles is 160 nm, and the weight-average molecular weight of the amorphous polyester resin is 13,000.

Preparation of Amorphous Polyester Resin Particle Dispersion (1-8)

Terephthalic acid: 30 parts by mol
Isophthalic acid: 20 parts by mol
Propylene oxide (2 mol) adduct of bisphenol A: 40 parts by mol
Ethylene oxide (2 mol) adduct of bisphenol A: 10 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-8) is cooled.

In the same manner as in the preparation of the amorphous polyester resin particle dispersion (1-1), an amorphous polyester resin particle dispersion (1-8) having a solid content of 20% is obtained using the reactant (1-8). In the amorphous polyester resin particle dispersion (1-8), the volume-average particle size of the resin particles is 150 nm, and the weight-average molecular weight of the amorphous polyester resin is 10,600.

Preparation of Amorphous Polyester Resin Particle Dispersion (1-9)

Terephthalic acid: 49 parts by mol
Glutaric acid: 1 part by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3.5 hours in the reaction solution kept at 240° C., and then a reactant (1-9) is cooled.

In the same manner as in the preparation of the amorphous polyester resin particle dispersion (1-1), an amorphous polyester resin particle dispersion (1-9) having a solid content of 20% is obtained using the reactant (1-9). In the amorphous polyester resin particle dispersion (1-9), the volume-average particle size of the resin particles is 165 nm, and the weight-average molecular weight of the amorphous polyester resin is 14,500.

Preparation of Amorphous Polyester Resin Particle Dispersion (1-10)

Terephthalic acid: 49 parts by mol
Hexadecanedioic acid: 1 part by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-10) is cooled.

In the same manner as in the preparation of the amorphous polyester resin particle dispersion (1-1), an amorphous polyester resin particle dispersion (1-10) having a solid content of 20% is obtained using the reactant (1-10). In the amorphous polyester resin particle dispersion (1-10), the volume-average particle size of the resin particles is 160 nm, and the weight-average molecular weight of the amorphous polyester resin is 12,500.

Preparation of Amorphous Polyester Resin Particle Dispersion (1-11)

Terephthalic acid: 49.9 parts by mol
Sebacic acid: 0.1 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 235° C. for 6 hours, a dehydration condensation reaction is continued for 4 hours in the reaction solution kept at 235° C., and then a reactant (1-11) is cooled.

In the same manner as in the preparation of the amorphous polyester resin particle dispersion (1-1), an amorphous polyester resin particle dispersion (1-11) having a solid content of 20% is obtained using the reactant (1-11). In the amorphous polyester resin particle dispersion (1-11), the volume-average particle size of the resin particles is 160 nm, and the weight-average molecular weight of the amorphous polyester resin is 13,600.

Preparation of Amorphous Polyester Resin Particle Dispersion (1-12)

Terephthalic acid: 41 parts by mol
Suberic acid: 9 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-12) is cooled.

In the same manner as in the preparation of the amorphous polyester resin particle dispersion (1-1), an amorphous polyester resin particle dispersion (1-12) having a solid content of 20% is obtained using the reactant (1-12). In the amorphous polyester resin particle dispersion (1-12), the volume-average particle size of the resin particles is 160 nm, and the weight-average molecular weight of the amorphous polyester resin is 12,800.

Preparation of Amorphous Polyester Resin Particle Dispersion (1-13)

Terephthalic acid: 40 parts by mol
Suberic acid: 10 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (1-13) is cooled.

In the same manner as in the preparation of the amorphous polyester resin particle dispersion (1-1), an amorphous polyester resin particle dispersion (1-13) having a solid content of 20% is obtained using the reactant (1-13). In the amorphous polyester resin particle dispersion (1-13), the volume-average particle size of the resin particles is 160 nm, and the weight-average molecular weight of the amorphous polyester resin is 11,200.

Preparation of Amorphous Polyester Resin Particle Dispersion (2-1)

Terephthalic acid: 38 parts by mol
Adipic acid: 10 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then the reactant (2-1) is cooled.

The molten reactant (2-1) is transferred as it is to CAVITRON CD1010 (manufactured by Eurotech Ltd.) at a rate of 100 g/min. At the same time, separately prepared 0.37% aqueous ammonia solution is transferred to CAVITRON CD1010 at a rate of 0.1 L/min in a state of being heated at 120° C. with a heat exchanger. CAVITRON CD1010 is operated under the conditions of a rotation speed of a rotor of 60 Hz and a pressure of 5 kg/cm$^2$, thereby obtaining a resin particle dispersion. Deionized water is added to the resin particle dispersion, thereby obtaining an amorphous polyester resin particle dispersion (2-1) having a solid content of 20%. In the amorphous polyester resin particle dispersion (2-1), the volume-average particle size of the resin particles is 160 nm, and the weight-average molecular weight of the amorphous polyester resin is 65,000.

Preparation of Amorphous Polyester Resin Particle Dispersion (2-2)

Terephthalic acid: 29 parts by mol
Isophthalic acid: 4 parts by mol
Adipic acid: 15 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-2) is cooled.

In the same manner as in the preparation of the amorphous polyester resin particle dispersion (2-1), an amorphous polyester resin particle dispersion (2-2) having a solid content of 20% is obtained using the reactant (2-2). In the amorphous polyester resin particle dispersion (2-2), the volume-average particle size of the resin particles is 170 nm, and the weight-average molecular weight of the amorphous polyester resin is 71,000.

Preparation of Amorphous Polyester Resin Particle Dispersion (2-3)

Terephthalic acid: 36 parts by mol
Sebacic acid: 12 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-3) is cooled.

In the same manner as in the preparation of the amorphous polyester resin particle dispersion (2-1), an amorphous polyester resin particle dispersion (2-3) having a solid content of 20% is obtained using the reactant (2-3). In the amorphous polyester resin particle dispersion (2-3), the volume-average particle size of the resin particles is 160 nm, and the weight-average molecular weight of the amorphous polyester resin is 62,000.

Preparation of Amorphous Polyester Resin Particle Dispersion (2-4)

Terephthalic acid: 26 parts by mol
Isophthalic acid: 10 parts by mol
Suberic acid: 11 parts by mol
Trimellitic anhydride: 3 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3.5 hours in the reaction solution kept at 240° C., and then a reactant (2-4) is cooled.

In the same manner as in the preparation of the amorphous polyester resin particle dispersion (2-1), an amorphous polyester resin particle dispersion (2-4) having a solid content of 20% is obtained using the reactant (2-4). In the amorphous polyester resin particle dispersion (2-4), the volume-average particle size of the resin particles is 165 nm, and the weight-average molecular weight of the amorphous polyester resin is 78,000.

Preparation of Amorphous Polyester Resin Particle Dispersion (2-5)

An amorphous polyester resin particle dispersion (2-5) having a solid content of 20% is obtained in the same manner as in the preparation of the amorphous polyester resin particle dispersion (2-4), except that the temperature of the dehydration condensation reaction is changed to 235° C. from 240° C. In the amorphous polyester resin particle dispersion (2-5), the volume-average particle size of the resin particles is 160 nm, and the weight-average molecular weight of the amorphous polyester resin is 71,000.

Preparation of Amorphous Polyester Resin Particle Dispersion (2-6)

Terephthalic acid: 40 parts by mol
Suberic acid: 8 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-6) is cooled.

In the same manner as in the preparation of the amorphous polyester resin particle dispersion (2-1), an amorphous polyester resin particle dispersion (2-6) having a solid content of 20% is obtained using the reactant (2-6). In the amorphous polyester resin particle dispersion (2-6), the volume-average particle size of the resin particles is 160 nm, and the weight-average molecular weight of the amorphous polyester resin is 54,000.

Preparation of Amorphous Polyester Resin Particle Dispersion (2-7)

An amorphous polyester resin particle dispersion (2-7) having a solid content of 20% is obtained in the same manner as in the preparation of the amorphous polyester resin particle dispersion (2-6), except that the temperature of the dehydration condensation reaction is changed to 235° C. from 240° C. In the amorphous polyester resin particle dispersion (2-7), the volume-average particle size of the resin particles is 150 nm, and the weight-average molecular weight of the amorphous polyester resin is 48,000.

Preparation of Amorphous Polyester Resin Particle Dispersion (2-8)

Terephthalic acid: 38 parts by mol
Isophthalic acid: 10 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-8) is cooled.

In the same manner as in the preparation of the amorphous polyester resin particle dispersion (2-1), an amorphous polyester resin particle dispersion (2-8) having a solid content of 20% is obtained using the reactant (2-8). In the amorphous polyester resin particle dispersion (2-8), the volume-average particle size of the resin particles is 160 nm, and the weight-average molecular weight of the amorphous polyester resin is 64,000.

Preparation of Amorphous Polyester Resin Particle Dispersion (2-9)

Terephthalic acid: 38 parts by mol
Glutaric acid: 10 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-9) is cooled.

In the same manner as in the preparation of the amorphous polyester resin particle dispersion (2-1), an amorphous polyester resin particle dispersion (2-9) having a solid content of 20% is obtained using the reactant (2-9). In the amorphous polyester resin particle dispersion (2-9), the volume-average particle size of the resin particles is 160 nm, and the weight-average molecular weight of the amorphous polyester resin is 59,000.

Preparation of Amorphous Polyester Resin Particle Dispersion (2-10)

Terephthalic acid: 38 parts by mol
Hexadecanedioic acid: 10 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-10) is cooled.

In the same manner as in the preparation of the amorphous polyester resin particle dispersion (2-1), an amorphous polyester resin particle dispersion (2-10) having a solid content of 20% is obtained using the reactant (2-10). In the amorphous polyester resin particle dispersion (2-10), the volume-average particle size of the resin particles is 150 nm, and the weight-average molecular weight of the amorphous polyester resin is 51,000.

Preparation of Amorphous Polyester Resin Particle Dispersion (2-11)

Terephthalic acid: 47.5 parts by mol
Sebacic acid: 0.5 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-11) is cooled.

In the same manner as in the preparation of the amorphous polyester resin particle dispersion (2-1), an amorphous polyester resin particle dispersion (2-11) having a solid content of 20% is obtained using the reactant (2-11). In the amorphous polyester resin particle dispersion (2-11), the volume-average particle size of the resin particles is 160 nm, and the weight-average molecular weight of the amorphous polyester resin is 66,000.

Preparation of Amorphous Polyester Resin Particle Dispersion (2-12)

Terephthalic acid: 47 parts by mol
Sebacic acid: 1 part by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then a reactant (2-12) is cooled.

In the same manner as in the preparation of the amorphous polyester resin particle dispersion (2-1), an amorphous polyester resin particle dispersion (2-12) having a solid content of 20% is obtained using the reactant (2-12). In the amorphous polyester resin particle dispersion (2-12), the volume-average particle size of the resin particles is 160 nm, and the weight-average molecular weight of the amorphous polyester resin is 60,000.

Preparation of Amorphous Polyester Resin Particle Dispersion (2-13)

Terephthalic acid: 31 parts by mol
Sebacic acid: 17 parts by mol
Trimellitic anhydride: 2 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3.5 hours in the reaction solution kept at 240° C., and then a reactant (2-13) is cooled.

In the same manner as in the preparation of the amorphous polyester resin particle dispersion (2-1), an amorphous polyester resin particle dispersion (2-13) having a solid content of 20% is obtained using the reactant (2-13). In the amorphous polyester resin particle dispersion (2-13), the volume-average particle size of the resin particles is 160 nm, and the weight-average molecular weight of the amorphous polyester resin is 69,000.

Preparation of Amorphous Styrene Acrylic Resin Particle Dispersion (A)

Styrene: 75 parts by mass
n-Butyl acrylate: 24 parts by mass
β-Carboxyethyl acrylate: 1 part by mass The above materials are added to a mixing vessel equipped with a stirrer and stirred. A mixed solution of 1.5 parts of an anionic surfactant (DOWFAX 2al manufactured by The Dow Chemical Company) and 48.5 parts of deionized water with respect to 100 parts of the above materials is added to a mixing vessel and stirred, thereby obtaining an emulsion (1). An anionic surfactant (2 parts, DOWFAX manufactured by The Dow Chemical Company) and 90 parts of deionized water are added to a reactor equipped with a stirrer and a nitrogen introduction tube and stirred. The emulsion (1) (5 parts) is added thereto, and 1 part of an aqueous ammonium persulfate solution having a concentration of 10% is further added thereto. The reactor is cleaned out by nitrogen purging, and the reaction solution is heated in an oil bath while being stirred such that the temperature of the reaction solution reaches 80° C., followed by stirring for 30 minutes. Furthermore, 145 parts of the emulsion (1) is added to the reactor, and the reaction solution is stirred for 3 hours in a state of being kept at 80° C. Next, the dispersion is cooled to room temperature, and deionized water is added to the dispersion, thereby obtaining an amorphous styrene acrylic resin particle dispersion (A) having a solid content of 20%. In the amorphous styrene acrylic resin particle dispersion (A), the volume-average particle size of the resin particles is 200 nm, and the weight-average molecular weight of the amorphous styrene acrylic resin is 18,000.

Preparation of Amorphous Styrene Acrylic Resin Particle Dispersion (B)

Styrene: 71.8 parts by mass
n-Butyl acrylate 27 parts by mass
1,6-Hexanediol diacrylate: 0.2 parts by mass
β-Carboxyethyl acrylate: 1 part by mass The above materials are added to a mixing vessel equipped with a stirrer and stirred. A mixed solution of 1.5 parts of an anionic surfactant (DOWFAX 2al manufactured by The Dow Chemical Company) and 48.5 parts of deionized water with respect to 100 parts of the above materials is added to a mixing vessel and stirred, thereby obtaining an emulsion (1).

An anionic surfactant (2 parts, DOWFAX manufactured by The Dow Chemical Company) and 90 parts of deionized water are added to a reactor equipped with a stirrer and a nitrogen introduction tube and stirred. The emulsion (1) (5 parts) is added thereto, and 1 part of an aqueous ammonium persulfate solution having a concentration of 10% is further added thereto. The reactor is cleaned out by nitrogen purging, and the reaction solution is heated in an oil bath while being stirred such that the temperature of the reaction solution reaches 80° C., followed by stirring for 30 minutes. Furthermore, 145 parts of the emulsion (1) is added to the reactor, and the reaction solution is stirred for 3 hours in a state of being kept at 80° C. Next, the dispersion is cooled to room temperature, and deionized water is added to the dispersion, thereby obtaining an amorphous styrene acrylic resin particle dispersion (B) having a solid content of 20%. In the amorphous styrene acrylic resin particle dispersion (B), the volume-average particle size of the resin particles is 200 nm, and the weight-average molecular weight of the amorphous styrene acrylic resin is 61,000.

Preparation of Crystalline Polyester Resin Particle Dispersion (1)

Dodecanedioic acid: 50 parts by mol 1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 2 hours in a state of being kept at 230° C. Thereafter, the reactant is cooled. After cooling, solid-liquid separation is performed, and the solids are dried, thereby obtaining a crystalline polyester resin (1).

Crystalline polyester resin (1): 100 parts

Methyl ethyl ketone: 40 parts

Isopropanol: 30 parts 0.10% Aqueous ammonia solution: 6 parts

The above materials are put in a jacketed reaction vessel equipped with a condenser, a thermometer, a water dripping device, and an anchor blade. In a state where the liquid temperature is being kept at 80° C. in a water circulation-type thermostatic bath, and the materials are being stirred and mixed together at 100 rpm, the resin is dissolved. Then, the water circulation-type thermostatic bath is set to 50° C., and a total of 400 parts of deionized water kept at 50° C. is added dropwise thereto at a rate of 10 parts/min such that phase transition occurs, thereby obtaining an emulsion. The obtained emulsion (576 parts) and 500 parts of deionized water are put in an eggplant flask and set in an evaporator equipped with a vacuum controlled unit via a trap ball. While being rotated, the eggplant flask is heated in a hot water bath at 60° C., and the pressure is reduced to 7 kPa with care to sudden boiling, thereby removing the solvent. At a point in time when the amount of solvent collected reaches 750 parts, the pressure is returned to normal pressure, and the eggplant flask is cooled in water, thereby obtaining a dispersion. Deionized water is added to the dispersion, thereby obtaining a crystalline polyester resin particle dispersion (1) having a solid content of 20%. In the crystalline polyester resin particle dispersion (1), the volume-average particle size of the resin particles is 180 nm, and the weight-average molecular weight of the crystalline polyester resin is 32,000.

Preparation of Crystalline Polyester Resin Particle Dispersion (2)

Sebacic acid: 50 parts by mol 1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 2 hours in a state of being kept at 230° C. Thereafter, the reactant is cooled. After cooling, solid-liquid separation is performed, and the solids are dried, thereby obtaining a crystalline polyester resin (2).

A crystalline polyester resin particle dispersion (2) having a solid content of 20% is obtained in the same manner as in the preparation of the crystalline polyester resin particle dispersion (1), except that the crystalline polyester resin (1) is changed to the crystalline polyester resin (2). In the crystalline polyester resin particle dispersion (2), the volume-average particle size of the resin particles is 150 nm, and the weight-average molecular weight of the crystalline polyester resin is 22,000.

Preparation of Crystalline Polyester Resin Particle Dispersion (3)

Sebacic acid: 50 parts by mol 1,9-Nonanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 2 hours in a state of being kept at 230° C. Thereafter, the reactant is cooled. After cooling, solid-liquid separation is performed, and the solids are dried, thereby obtaining a crystalline polyester resin (3).

A crystalline polyester resin particle dispersion (3) having a solid content of 20% is obtained in the same manner as in the preparation of the crystalline polyester resin particle dispersion (1), except that the crystalline polyester resin (1) is changed to the crystalline polyester resin (3). In the crystalline polyester resin particle dispersion (3), the volume-average particle size of the resin particles is 170 nm, and the weight-average molecular weight of the crystalline polyester resin is 39,000.

Preparation of Crystalline Polyester Resin Particle Dispersion (4)

Dodecanedioic acid: 50 parts by mol 1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 220° C. under reduced pressure (3 kPa), and the reaction solution is stirred for 2.5 hours in a state of being kept at 220° C. Thereafter, the reactant is cooled. After cooling, solid-liquid separation is performed, and the solids are dried, thereby obtaining a crystalline polyester resin (4).

A crystalline polyester resin particle dispersion (4) having a solid content of 20% is obtained in the same manner as in the preparation of the crystalline polyester resin particle dispersion (1), except that the crystalline polyester resin (1) is changed to the crystalline polyester resin (4). In the crystalline polyester resin particle dispersion (4), the volume-average particle size of the resin particles is 140 nm, and the weight-average molecular weight of the crystalline polyester resin is 17,000.

Preparation of Crystalline Polyester Resin Particle Dispersion (5)

Dodecanedioic acid: 50 parts by mol 1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 225° C. under reduced pressure (3 kPa), and the reaction solution is stirred for 2 hours in a state of being kept at 225° C. Thereafter, the reactant is cooled. After cooling, solid-liquid separation is performed, and the solids are dried, thereby obtaining a crystalline polyester resin (5).

A crystalline polyester resin particle dispersion (5) having a solid content of 20% is obtained in the same manner as in the preparation of the crystalline polyester resin particle dispersion (1), except that the crystalline polyester resin (1) is changed to the crystalline polyester resin (5). In the crystalline polyester resin particle dispersion (5), the volume-average particle size of the resin particles is 150 nm, and the weight-average molecular weight of the crystalline polyester resin is 19,000.

Preparation of Crystalline Polyester Resin Particle Dispersion (6)

Dodecanedioic acid: 50 parts by mol 1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 3.5 hours in a state of being kept at 230° C. Thereafter, the reactant is cooled. After cooling, solid-liquid separation is performed, and the solids are dried, thereby obtaining a crystalline polyester resin (6).

A crystalline polyester resin particle dispersion (6) having a solid content of 20% is obtained in the same manner as in the preparation of the crystalline polyester resin particle dispersion (1), except that the crystalline polyester resin (1) is changed to the crystalline polyester resin (6). In the crystalline polyester resin particle dispersion (6), the volume-average particle size of the resin particles is 180 nm, and the weight-average molecular weight of the crystalline polyester resin is 52,000.

Preparation of Crystalline Polyester Resin Particle Dispersion (7)

Dodecanedioic acid: 50 parts by mol
1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 235° C. under reduced pressure (3 kPa), and the reaction solution is stirred for 2.5 hours in a state of being kept at 235° C. Thereafter, the reactant is cooled. After cooling, solid-liquid separation is performed, and the solids are dried, thereby obtaining a crystalline polyester resin (7).

A crystalline polyester resin particle dispersion (7) having a solid content of 20% is obtained in the same manner as in the preparation of the crystalline polyester resin particle dispersion (1), except that the crystalline polyester resin (1) is changed to the crystalline polyester resin (7). In the crystalline polyester resin particle dispersion (7), the volume-average particle size of the resin particles is 190 nm, and the weight-average molecular weight of the crystalline polyester resin is 55,000.

Preparation of Crystalline Polyester Resin Particle Dispersion (8)

Terephthalic acid: 50 parts by mol
1,9-Nonanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 2 hours in a state of being kept at 230° C. Thereafter, the reactant is cooled. After cooling, solid-liquid separation is performed, and the solids are dried, thereby obtaining a crystalline polyester resin (8).

A crystalline polyester resin particle dispersion (8) having a solid content of 20% is obtained in the same manner as in the preparation of the crystalline polyester resin particle dispersion (1), except that the crystalline polyester resin (1) is changed to the crystalline polyester resin (8). In the crystalline polyester resin particle dispersion (8), the volume-average particle size of the resin particles is 160 nm, and the weight-average molecular weight of the crystalline polyester resin is 26,000.

Preparation of Crystalline Polyester Resin Particle Dispersion (9)

Glutaric acid: 50 parts by mol
1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 2 hours in a state of being kept at 230° C. Thereafter, the reactant is cooled. After cooling, solid-liquid separation is performed, and the solids are dried, thereby obtaining a crystalline polyester resin (9).

A crystalline polyester resin particle dispersion (9) having a solid content of 20% is obtained in the same manner as in the preparation of the crystalline polyester resin particle dispersion (1), except that the crystalline polyester resin (1) is changed to the crystalline polyester resin (9). In the crystalline polyester resin particle dispersion (9), the volume-average particle size of the resin particles is 170 nm, and the weight-average molecular weight of the crystalline polyester resin is 26,000.

Preparation of Crystalline Polyester Resin Particle Dispersion (10)

Hexadecanedioic acid: 50 parts by mol
1,6-Hexanediol: 50 parts by mol

The above materials are put in a reactor equipped with a stirrer, a nitrogen introduction tube, a temperature sensor, and a rectifying column, the temperature is raised to 160° C. for 1 hour, and dibutyltin oxide is added thereto in an amount of 0.8 parts with respect to 100 parts of the above materials. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 2 hours in a state of being kept at 230° C. Thereafter, the reactant is cooled. After cooling, solid-liquid separation is performed, and the solids are dried, thereby obtaining a crystalline polyester resin (10).

A crystalline polyester resin particle dispersion (10) having a solid content of 20% is obtained in the same manner as in the preparation of the crystalline polyester resin particle dispersion (1), except that the crystalline polyester resin (1) is changed to the crystalline polyester resin (10). In the crystalline polyester resin particle dispersion (10), the volume-average particle size of the resin particles is 175 nm, and the weight-average molecular weight of the crystalline polyester resin is 28,000.

Preparation of Crystalline Vinyl Resin Particle Dispersion (A)

Toluene (500 parts) is put in a reactor equipped with a stirrer, a heating/cooling device, a thermometer, a dropping funnel, and a nitrogen blowing tube. Furthermore, 350 parts of toluene, 150 parts of behenyl acrylate, and 7.5 parts of azobisisobutyronitrile (AIBN) are put in another glass beaker, stirred and mixed together at 20° C. to prepare a monomer solution, and the monomer solution is put in the dropping funnel. After the gas phase portion in the reactor is cleaned out by nitrogen purging, the monomer solution is then added dropwise to the reactor at 80° C. for 2 hours in an airtight state and aged for 2 hours at 85° C. after the dropwise addition ends, and then toluene is removed under reduced pressure at 130° C. for 3 hours, thereby obtaining a crystalline vinyl resin (A).

A crystalline vinyl resin particle dispersion (A) having a solid content of 20% is obtained in the same manner as in the preparation of the crystalline polyester resin particle dispersion (1), except that the crystalline polyester resin (1) is changed to the crystalline vinyl resin (A). In the crystalline vinyl resin particle dispersion (A), the volume-average particle size of the resin particles is 190 nm, and the weight-average molecular weight of the crystalline vinyl resin is 48,000.

Preparation of Crosslinked Resin Particle Dispersion (1)

Styrene: 50 parts by mass
n-Butyl acrylate 48 parts by mass
Tetraethylene glycol diacrylate: 2 parts by mass The above materials are added to a mixing vessel equipped with a stirrer and stirred. A mixed solution of 1.5 parts of an anionic surfactant (DOWFAX 2al manufactured by The Dow Chemical Company) and 48.5 parts of deionized water with respect to 100 parts of the above materials is added to a mixing vessel and stirred, thereby obtaining an emulsion (1).

An anionic surfactant (2 parts, DOWFAX manufactured by The Dow Chemical Company) and 90 parts of deionized water are added to a reactor equipped with a stirrer and a nitrogen introduction tube and stirred. The emulsion (1) (3 parts) is added thereto, and 3 parts of an aqueous ammonium persulfate solution having a concentration of 10% is further added thereto. The reactor is cleaned out by nitrogen purging, the reaction solution is heated in an oil bath while being stirred such that the temperature of the reaction solution reaches 70° C., and the reaction solution is stirred for 50 minutes in a state of being kept at the same temperature. Thereafter, 145 parts of the emulsion (1) is added to the reactor, the reaction solution is heated in an oil bath while being stirred such that the temperature of the reaction solution reaches 75° C. The reaction solution is stirred for 3 hours in a state of being kept at the same temperature and then cooled to room temperature, and deionized water is added to the dispersion, thereby obtaining a crosslinked resin particle dispersion (1) having a solid content of 20%. The volume-average particle size of resin particles in the crosslinked resin particle dispersion (1) is 140 nm.

Preparation of Crosslinked Resin Particle Dispersion (2)

Styrene: 50 parts by mass
n-Butyl acrylate 48 parts by mass
1,10-Decanediol diacrylate: 2 parts by mass The above materials are added to a mixing vessel equipped with a stirrer and stirred. A mixed solution of 1.5 parts of an anionic surfactant (DOWFAX 2al manufactured by The Dow Chemical Company) and 48.5 parts of deionized water with respect to 100 parts of the above materials is added to a mixing vessel and stirred, thereby obtaining an emulsion (2).

A crosslinked resin particle dispersion (2) having a solid content of 20% is obtained in the same manner as in the preparation of the crosslinked resin particle dispersion (1), except that the emulsion (1) is changed to the emulsion (2). The volume-average particle size of resin particles in the crosslinked resin particle dispersion (2) is 150 nm.

Preparation of Crosslinked Resin Particle Dispersion (3)

Styrene: 50 parts by mass
n-Butyl acrylate: 48 parts by mass
Triethylene glycol dimethacrylate: 2 parts by mass The above materials are added to a mixing vessel equipped with a stirrer and stirred. A mixed solution of 1.5 parts of an anionic surfactant (DOWFAX 2al manufactured by The Dow Chemical Company) and 48.5 parts of deionized water with respect to 100 parts of the above materials is added to a mixing vessel and stirred, thereby obtaining an emulsion (3).

A crosslinked resin particle dispersion (3) having a solid content of 20% is obtained in the same manner as in the preparation of the crosslinked resin particle dispersion (1), except that the emulsion (1) is changed to the emulsion (3). The volume-average particle size of resin particles in the crosslinked resin particle dispersion (3) is 150 nm.

Preparation of Colorant Particle Dispersion

C. I. Pigment Blue 15: 3 (Dainichiseika Color & Chemicals Mfg. Co., Ltd.): 70 parts
Anionic surfactant (NEOGEN RK, DKS Co., Ltd.): 5 parts
Deionized water: 200 parts The above materials are mixed together and dispersed for 10 minutes by using a homogenizer (ULTRA-TURRAX T50 manufactured by IKA). Deionized water is added to the dispersion, thereby obtaining a colorant particle dispersion (1) having a solid content of 20%. The volume-average particle size of colorant particles in the colorant particle dispersion (1) is 170 nm.

Preparation of Release Agent Particle Dispersion

Fischer-Tropsch wax (melting point 90° C., trade name FNP0090, manufactured by NIPPON SEIRO CO., LTD.): 50 parts
Anionic surfactant (NEOGEN RK, DKS Co., Ltd.): 1 part
Deionized water: 150 parts The above materials are mixed together, heated to 95° C., and dispersed using a homogenizer (ULTRA-TURRAX T50 manufactured by IKA). Furthermore, a dispersion treatment is performed using a Manton Gaulin high-pressure homogenizer (manufactured by Gaulin Corporation), and deionized water is added to the dispersion, thereby obtaining a release agent particle dispersion (1) having a solid content of 20%. The volume-average particle size of release agent particles in the release agent particle dispersion (1) is 180 nm.

Example 1

Manufacturing of Toner Particles (1)

Amorphous polyester resin particle dispersion (1-1) (solid content 20%): 20 parts
Amorphous polyester resin particle dispersion (2-1) (solid content 20%): 20 parts
Crystalline polyester resin particle dispersion (1) (solid content 20%): 18 parts
Crosslinked resin particle dispersion (1) (solid content 20%): 5 parts
Colorant particle dispersion (1) (solid content 20%): 6 parts
Release agent particle dispersion (1) (solid content 20%): 6 parts
Anionic surfactant (PELEX SS-L, Kao Corporation.): 0.3 parts
Deionized water: 50 parts The above materials are put in a reactor equipped with a thermometer, a pH meter, and a stirrer, heated to a temperature of 30° C. from the outside with a mantle heater, and kept as it is for 30 minutes while being stirred at a rotation speed of 150 rpm. Thereafter, a 0.3N aqueous nitric acid solution is added thereto such that the pH is adjusted to 3.0, and then a 3% aqueous polyaluminum chloride solution is added thereto in a state where the reaction solution is being dispersed with a homogenizer (ULTRA-TURRAX T50 manufactured by IKA). Then, in a state where the reaction solution is being stirred, the temperature thereof is raised to 45° C. at 0.2° C./min and kept for 30 minutes. Next, 12.5 parts of the amorphous polyester resin particle dispersion (1-1) (solid content of 20%) and 12.5 parts of the amorphous polyester resin particle dispersion (2-1) (solid content of 20%) are added thereto, and the reaction solution is kept as it is for 1 hour. Subsequently, a 0.1N aqueous sodium hydroxide solution is added thereto such that the pH is adjusted to 8.5, and the reaction solution is kept as it is for 15 minutes, then heated to 85° C. at 1° C./min while being continuously stirred, and kept as it is at 85° C. for 5 hours. Thereafter, cooling, solid-liquid separation, washing and drying of the solids are sequentially carried out, thereby obtaining toner particles (1) having a volume-average particle size of 4.8 μm.

Manufacturing of Toner and Developer

The toner particles (100 parts) and 1.6 parts of sol-gel silica particles (average particle size of 130 nm) having undergone a hydrophobic treatment are mixed together by a Henschel mixer, thereby obtaining a toner (1). The toner (1) (8 parts) and 100 parts of the following carrier are mixed together, thereby obtaining a developer (1).

Ferrite particles (average particle size 50 m): 100 parts
Toluene: 14 parts
Styrene-methyl methacrylate copolymer (copolymerization ratio 15/85): 3 parts
Carbon black: 0.2 parts The above components excluding the ferrite particles are dispersed with a sand mill, thereby preparing a dispersion. The dispersion is put in a vacuum deaeration-type kneader together with the ferrite particles, and dried under reduced pressure while being stirred, thereby obtaining a carrier.

Examples 2 to 44

Toners (2) to (44) and developers (2) to (44) are prepared in the same manner as in Example 1 by using the materials listed in Table 1-1 and the like.

Comparative Example 1

Preparation of Amorphous Polyester Resin Particle Dispersion (1-14)

Terephthalic acid: 43 parts by mol
Dodecenyl succinic acid: 7 parts by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then the reactant is cooled.

The molten reactant is transferred as it is to CAVITRON CD1010 (manufactured by Eurotech Ltd.) at a rate of 100 g/min. At the same time, separately prepared 0.37% aqueous ammonia solution is transferred to CAVITRON CD1010 at a rate of 0.1 L/min in a state of being heated at 120° C. with a heat exchanger. CAVITRON CD1010 is operated under the conditions of a rotation speed of a rotor of 60 Hz and a pressure of 5 $kg/cm^2$, thereby obtaining a resin particle dispersion. Deionized water is added to the resin particle dispersion, thereby obtaining an amorphous polyester resin particle dispersion (1-14) having a solid content of 20%. In the amorphous polyester resin particle dispersion (1-14), the volume-average particle size of the resin particles is 160 nm, and the weight-average molecular weight of the amorphous polyester resin is 14,000.

Preparation of Amorphous Polyester Resin Particle Dispersion (2-14)

Terephthalic acid: 44 parts by mol
Dodecenyl succinic acid: 5 parts by mol
Trimellitic anhydride: 1 part by mol
Propylene oxide (2 mol) adduct of bisphenol A: 50 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then the reactant is cooled.

The molten reactant is transferred as it is to CAVITRON CD1010 (manufactured by Eurotech Ltd.) at a rate of 100 g/min. At the same time, separately prepared 0.37% aqueous ammonia solution is transferred to CAVITRON CD1010 at a rate of 0.1 L/min in a state of being heated at 120° C. with a heat exchanger. CAVITRON CD1010 is operated under the conditions of a rotation speed of a rotor of 60 Hz and a pressure of 5 $kg/cm^2$, thereby obtaining a resin particle dispersion. Deionized water is added to the resin particle dispersion, thereby obtaining an amorphous polyester resin particle dispersion (2-14) having a solid content of 20%. In the amorphous polyester resin particle dispersion (2-14), the volume-average particle size of the resin particles is 160 nm, and the weight-average molecular weight of the amorphous polyester resin is 65,000.

Manufacturing of Toner Particles (41)

- Amorphous polyester resin particle dispersion (1-14) (solid content 20%): 20 parts
- Amorphous polyester resin particle dispersion (2-14) (solid content 20%): 20 parts
- Crystalline polyester resin particle dispersion (1) (solid content 20%): 18 parts
- Colorant particle dispersion (1) (solid content 20%): 6 parts
- Release agent particle dispersion (1) (solid content 20%): 6 parts
- Anionic surfactant (PELEX SS-L, Kao Corporation.): 0.3 parts
- Deionized water: 50 parts The above materials are put in a reactor equipped with a thermometer, a pH meter, and a stirrer, heated to a temperature of 30° C. from the outside with a mantle heater, and kept as it is for 30 minutes while being stirred at a rotation speed of 150 rpm. Thereafter, a 0.3N aqueous nitric acid solution is added thereto such that the pH is adjusted to 3.0, and then a 3% aqueous polyaluminum chloride solution is added thereto in a state where the reaction solution is being dispersed with a homogenizer (ULTRA-TURRAX T50 manufactured by IKA). Then, in a state where the reaction solution is being stirred, the temperature thereof is raised to 45° C. at 0.2° C./min and kept for 30 minutes. Next, 15 parts of the amorphous polyester resin particle dispersion (1-14) (solid content of 20%) and 15 parts of the amorphous polyester resin particle dispersion (2-14) (solid content of 20%) are added thereto, and the reaction solution is kept as it is for 1 hour. Subsequently, a 0.1N aqueous sodium hydroxide solution is added thereto such that the pH is adjusted to 8.5, and the reaction solution is kept as it is for 15 minutes, then heated to 85° C. at 1° C./min while being continuously stirred, and kept as it is at 85° C. for 5 hours. Thereafter, cooling, solid-liquid separation, washing and drying of the solids are sequentially carried out, thereby obtaining toner particles (41) having a volume-average particle size of 4.8 μm.

Manufacturing of Toner and Developer

By using the toner particles (41), a toner (45) and a developer (45) are obtained in the same manner as in Example 1.

Comparative Example 2

Preparation of Sorbitan Acid Stearate Dispersion

- Solbitan monostearate (FUJIFILM Wako Pure Chemical Corporation): 50 parts
- Anionic surfactant (PELEX SS-H, Kao Corporation.): 1 part
- Deionized water: 150 parts The above materials are mixed together, heated to 80° C., and dispersed using a homogenizer (ULTRA-TURRAX T50 manufactured by IKA). Furthermore, a dispersion treatment is performed using a Manton Gaulin high-pressure homogenizer (manufactured by Gaulin Corporation), and deionized water is added to the dispersion, thereby obtaining a sorbitan acid stearate dispersion having a solid content of 20%. In the sorbitan acid stearate dispersion (1), the sorbitan acid stearate particles have a volume-average particle size of 280 nm.

Manufacturing of Toner Particles (42)

- Amorphous polyester resin particle dispersion (1-14) (solid content 20%): 20 parts
- Amorphous polyester resin particle dispersion (2-14) (solid content 20%): 20 parts
- Crystalline polyester resin particle dispersion (1) (solid content 20%): 18 parts
- Colorant particle dispersion (1) (solid content 20%): 6 parts
- Release agent particle dispersion (1) (solid content 20%): 6 parts
- Anionic surfactant (PELEX SS-L, Kao Corporation.): 0.3 parts
- Deionized water: 50 parts The above materials are put in a reactor equipped with a thermometer, a pH meter, and a stirrer, heated to a temperature of 30° C. from the outside with a mantle heater, and kept as it is for 30 minutes while being stirred at a rotation speed of 150 rpm. Thereafter, a 0.3N aqueous nitric acid solution is added thereto such that the pH is adjusted to 3.0, and then a 3% aqueous polyaluminum chloride solution is added thereto in a state where the reaction solution is being dispersed with a homogenizer (ULTRA-TURRAX T50 manufactured by IKA). Next, 0.5 part of the sorbitan acid stearate dispersion is added thereto. Then, in a state where the reaction solution is being stirred, the temperature thereof is raised to 45° C. at 0.2° C./min and kept for 30 minutes. Thereafter, 14.5 parts of the amorphous polyester resin particle dispersion (1-14) (solid content of 20%) and 15 parts of the amorphous polyester resin particle dispersion (2-14) (solid content of 20%) are added thereto, and the reaction solution is kept as it is for 1 hour. Subsequently, a 0.1N aqueous sodium hydroxide solution is added thereto such that the pH is adjusted to 8.5, and the reaction solution is kept as it is for 15 minutes, then heated to 85° C. at 1° C./min while being continuously stirred, and kept as it is at 85° C. for 5 hours. Thereafter, cooling, solid-liquid separation, washing and drying of the solids are sequentially carried out, thereby obtaining toner particles (42) having a volume-average particle size of 4.8 m.

Manufacturing of Toner and Developer

By using the toner particles (42), a toner (46) and a developer (46) are manufactured in the same manner as in Example 1.

Performance Evaluation

The developer of each of the examples or comparative examples is put in a developing device of an electrophotographic image forming apparatus. A solid image is formed on the entire surface of coated paper (OS COAT W, basis weight 127 $g/m^2$, FUJIFILM Business Innovation Corp.) in a toner application amount of 12 $g/m^2$ (the paper has a margin of 2 mm at the edges).

The coated paper on which the image is formed is subjected to a hot lamination process using a laminator (PLB-R2A32, Nakabayashi Co., Ltd.) and a laminate film (LPR-A4E2-15, Nakabayashi Co., Ltd.). The temperature applied to the coated paper and the laminate film during the hot lamination process is set to be in a range of 110° C. or higher and 140° C. or lower.

Evaluation 1

The laminated product is left to stand for 24 hours in an environment at a temperature of 25° C. Then, the tip of the laminated product is fixed to a peel testing machine (STROGRAPH VG, Toyo Seiki Seisaku-sho, Ltd.), and a 90-degree peel test is performed. The force (N) required for peeling the laminate film is measured, and the maximum value of the force is classified as follows.

A: 2.0 N or more

B: Less than 2.0 N and 1.5 N or more

C: Less than 1.5 N and 1.0 N or more

D: Less than 1.0 N

Evaluation 2

A thermal cycle configured with heating to 75° C. from 30° C. at a rate of 1° C./min, keeping the temperature at 75° C. for 120 minutes, and cooling to 30° C. from 75° C. at a rate of 1° C./min is performed 5 times on the laminated product. Then, the tip of the laminated product is fixed to a peel testing machine (STROGRAPH VG, Toyo Seiki Seisaku-sho, Ltd.), and a 90-degree peel test is performed. The force (N) required for peeling the laminate film is measured, and the maximum value of the force is classified as follows.

A: 2.0 N or more

B: Less than 2.0 N and 1.5 N or more

C: Less than 1.5 N and 1.0 N or more

D: Less than 1.0 N

Table 1-1 and the like show the materials for manufacturing the toner, and Table 2-1 and the like show the physical properties of the toner and the evaluation results.

TABLE 1

| | Toner | Toner Particle | Base particle composition Raw materials prepared | | | | | | | |
|---|---|---|---|---|---|---|---|---|---|---|
| | No. | No. | Amorphous resin | | | | Crystalline resin | | Crosslinked resin | |
| Comparative Example 1 | 45 | 41 | Amorphous polyester resin dispersion (1-14) | 20 parts | Amorphous polyester resin dispersion (2-14) | 20 parts | Crystalline polyester resin dispersion (1) | 18 parts | — | 0 parts |
| Comparative Example 2 | 46 | 42 | Amorphous polyester resin dispersion (1-14) | 20 parts | Amorphous polyester resin dispersion (2-14) | 20 parts | Crystalline polyester resin dispersion (1) | 18 parts | — | 0 parts |
| Example 1 | 1 | 1 | Amorphous polyester resin dispersion (1-1) | 20 parts | Amorphous polyester resin dispersion (2-1) | 20 parts | Crystalline polyester resin dispersion (1) | 18 parts | Crosslinked resin particle dispersion (1) | 5 parts |
| Example 2 | 2 | 2 | Amorphous polyester resin dispersion (1-2) | 22 parts | Amorphous polyester resin dispersion (2-2) | 22 parts | Crystalline polyester resin dispersion (2) | 15 parts | Crosslinked resin particle dispersion (1) | 4 parts |
| Example 3 | 3 | 3 | Amorphous polyester resin dispersion (1-2) | 26 parts | Amorphous polyester resin dispersion (2-2) | 26 parts | Crystalline polyester resin dispersion (2) | 15 parts | Crosslinked resin particle dispersion (1) | 4 parts |
| Example 4 | 4 | 4 | Amorphous polyester resin dispersion (1-3) | 9.5 parts | Amorphous polyester resin dispersion (2-3) | 9.5 parts | Crystalline polyester resin dispersion (1) | 27 parts | Crosslinked resin particle dispersion (2) | 15 parts |
| Example 5 | 5 | 5 | Amorphous polyester resin dispersion (1-3) | 7 parts | Amorphous polyester resin dispersion (2-3) | 7 parts | Crystalline polyester resin dispersion (1) | 27 parts | Crosslinked resin particle dispersion (2) | 15 parts |
| Example 6 | 6 | 6 | Amorphous polyester resin dispersion (1-1) | 24 parts | Amorphous polyester resin dispersion (2-1) | 24 parts | Crystalline polyester resin dispersion (1) | 12 parts | Crosslinked resin particle dispersion (1) | 3 parts |
| Example 7 | 7 | 7 | Amorphous polyester resin dispersion (1-1) | 23 parts | Amorphous polyester resin dispersion (2-1) | 23 parts | Crystalline polyester resin dispersion (1) | 14 parts | Crosslinked resin particle dispersion (1) | 3 parts |
| Example 8 | 8 | 8 | Amorphous polyester resin dispersion (1-1) | 7.5 parts | Amorphous polyester resin dispersion (2-1) | 7.5 parts | Crystalline polyester resin dispersion (3) | 32 parts | Crosslinked resin particle dispersion (3) | 20 parts |
| Example 9 | 9 | 9 | Amorphous polyester resin dispersion (1-1) | 6.5 parts | Amorphous polyester resin dispersion (2-1) | 6.5 parts | Crystalline polyester resin dispersion (3) | 34 parts | Crosslinked resin particle dispersion (3) | 20 parts |

TABLE 1-continued

| | | | | | | | | | | |
|---|---|---|---|---|---|---|---|---|---|---|
| Example 10 | 10 | 10 | Amorphous polyester resin dispersion (1-4) | 17.5 parts | Amorphous polyester resin dispersion (2-1) | 17.5 parts | Crystalline polyester resin dispersion (4) | 23 parts | Crosslinked resin particle dispersion (1) | 5 parts |
| Example 11 | 11 | 11 | Amorphous polyester resin dispersion (1-4) | 17.5 parts | Amorphous polyester resin dispersion (2-1) | 17.5 parts | Crystalline polyester resin dispersion (5) | 23 parts | Crosslinked resin particle dispersion (1) | 5 parts |
| Example 12 | 12 | 12 | Amorphous polyester resin dispersion (1-5) | 20 parts | Amorphous polyester resin dispersion (2-1) | 20 parts | Crystalline polyester resin dispersion (6) | 18 parts | Crosslinked resin particle dispersion (1) | 5 parts |
| Example 13 | 13 | 13 | Amorphous polyester resin dispersion (1-5) | 20 parts | Amorphous polyester resin dispersion (2-1) | 20 parts | Crystalline polyester resin dispersion (7) | 18 parts | Crosslinked resin particle dispersion (1) | 5 parts |
| Example 14 | 14 | 14 | Amorphous polyester resin dispersion (1-6) | 20 parts | Amorphous polyester resin dispersion (2-4) | 20 parts | Crystalline polyester resin dispersion (1) | 18 parts | Crosslinked resin particle dispersion (2) | 5 parts |
| Example 15 | 15 | 15 | Amorphous polyester resin dispersion (1-6) | 20 parts | Amorphous polyester resin dispersion (2-5) | 20 parts | Crystalline polyester resin dispersion (1) | 18 parts | Crosslinked resin particle dispersion (2) | 5 parts |
| Example 16 | 16 | 16 | Amorphous polyester resin dispersion (1-7) | 20 parts | Amorphous polyester resin dispersion (2-6) | 20 parts | Crystalline polyester resin dispersion (1) | 18 parts | Crosslinked resin particle dispersion (1) | 5 parts |
| Example 17 | 17 | 17 | Amorphous polyester resin dispersion (1-7) | 20 parts | Amorphous polyester resin dispersion (2-7) | 20 parts | Crystalline polyester resin dispersion (1) | 18 parts | Crosslinked resin particle dispersion (1) | 5 parts |
| Example 18 | 18 | 18 | Amorphous polyester resin dispersion (A) | 21 parts | Amorphous polyester resin dispersion (B) | 21 parts | Crystalline vinyl resin particle dispersion (A) | 14 parts | Crosslinked resin particle dispersion (1) | 7 parts |
| Example 19 | 19 | 19 | Amorphous polyester resin dispersion (1-8) | 20 parts | Amorphous polyester resin dispersion (2-8) | 20 parts | Crystalline polyester resin dispersion (1) | 18 parts | Crosslinked resin particle dispersion (1) | 5 parts |
| Example 20 | 20 | 20 | Amorphous polyester resin dispersion (1-1) | 20 parts | Amorphous polyester resin dispersion (2-1) | 20 parts | Crystalline polyester resin dispersion (8) | 18 parts | Crosslinked resin particle dispersion (1) | 5 parts |
| Example 21 | 21 | 21 | Amorphous polyester resin dispersion (1-9) | 20 parts | Amorphous polyester resin dispersion (2-9) | 20 parts | Crystalline polyester resin dispersion (1) | 18 parts | Crosslinked resin particle dispersion (1) | 5 parts |
| Example 22 | 22 | 22 | Amorphous polyester resin dispersion (1-10) | 20 parts | Amorphous polyester resin dispersion (2-9) | 20 parts | Crystalline polyester resin dispersion (1) | 18 parts | Crosslinked resin particle dispersion (1) | 5 parts |

TABLE 1-continued

| | | | | | | | | | | | | |
|---|---|---|---|---|---|---|---|---|---|---|---|---|
| Example 23 | 23 | 23 | Amorphous polyester resin dispersion (1-1) | 20 parts | Amorphous polyester resin dispersion (2-1) | 20 parts | Crystalline polyester resin dispersion (9) | 18 parts | | | Crosslinked resin particle dispersion (1) | 5 parts |
| Example 24 | 24 | 24 | Amorphous polyester resin dispersion (1-1) | 20 parts | Amorphous polyester resin dispersion (2-1) | 20 parts | Crystalline polyester resin dispersion (10) | 18 parts | | | Crosslinked resin particle dispersion (1) | 5 parts |
| Example 25 | 25 | 25 | Amorphous polyester resin dispersion (1-11) | 20 parts | Amorphous polyester resin dispersion (2-11) | 20 parts | Crystalline polyester resin dispersion (1) | 18 parts | | | Crosslinked resin particle dispersion (1) | 5 parts |
| Example 26 | 26 | 26 | Amorphous polyester resin dispersion (1-11) | 20 parts | Amorphous polyester resin dispersion (2-12) | 20 parts | Crystalline polyester resin dispersion (1) | 18 parts | | | Crosslinked resin particle dispersion (1) | 5 parts |
| Example 27 | 27 | 27 | Amorphous polyester resin dispersion (1-12) | 20 parts | Amorphous polyester resin dispersion (2-13) | 20 parts | Crystalline polyester resin dispersion (1) | 18 parts | | | Crosslinked resin particle dispersion (1) | 5 parts |
| Example 28 | 28 | 28 | Amorphous polyester resin dispersion (1-13) | 20 parts | Amorphous polyester resin dispersion (2-13) | 20 parts | Crystalline polyester resin dispersion (1) | 18 parts | | | Crosslinked resin particle dispersion (1) | 7 parts |
| Example 29 | 29 | 29 | Amorphous polyester resin dispersion (1-1) | 20 parts | Amorphous polyester resin dispersion (2-1) | 20 parts | Crystalline polyester resin dispersion (1) | 10.4 parts | Crystalline vinyl resin particle dispersion (A) | 7.6 parts | Crosslinked resin particle dispersion (1) | 5 parts |
| Example 30 | 30 | 30 | Amorphous polyester resin dispersion (1-1) | 20 parts | Amorphous polyester resin dispersion (2-1) | 20 parts | Crystalline polyester resin dispersion (1) | 11.2 parts | Crystalline vinyl resin particle dispersion (A) | 6.8 parts | Crosslinked resin particle dispersion (1) | 5 parts |
| Example 31 | 31 | 31 | Amorphous polyester resin dispersion (1-12) | 20 parts | Amorphous polyester resin dispersion (2-13) | 20 parts | Crystalline polyester resin dispersion (1) | 13.5 parts | Crystalline vinyl resin particle dispersion (A) | 0.5 parts | Crosslinked resin particle dispersion (1) | 5 parts |
| Example 32 | 32 | 32 | Amorphous polyester resin dispersion (1-12) | 20 parts | Amorphous polyester resin dispersion (2-13) | 20 parts | Crystalline polyester resin dispersion (1) | 12.8 parts | Crystalline vinyl resin particle dispersion (A) | 12 parts | Crosslinked resin particle dispersion (1) | 5 parts |
| Example 33 | 33 | 33 | Amorphous polyester resin dispersion (1-1) | 21 parts | Amorphous polyester resin dispersion (2-1) | 21 parts | Crystalline polyester resin dispersion (1) | 21 parts | | | — | 0 parts |
| Example 34 | 34 | 34 | Amorphous polyester resin dispersion (1-1) | 20 parts | Amorphous polyester resin dispersion (2-1) | 20 parts | Crystalline polyester resin dispersion (1) | 21.5 parts | | | Crosslinked resin particle dispersion (1) | 1.5 parts |

TABLE 1-continued

| | | | | | | | | | | | | |
|---|---|---|---|---|---|---|---|---|---|---|---|---|
| Example 35 | 35 | 35 | Amorphous polyester resin dispersion (1-1) | 12 parts | Amorphous polyester resin dispersion (2-1) | 12 parts | Crystalline polyester resin dispersion (1) | 12 parts | | | Crosslinked resin particle dispersion (1) | 28 parts |
| Example 36 | 36 | 36 | Amorphous polyester resin dispersion (1-1) | 11 parts | Amorphous polyester resin dispersion (2-1) | 11 parts | Crystalline polyester resin dispersion (1) | 11 parts | | | Crosslinked resin particle dispersion (1) | 31 parts |
| Example 37 | 37 | 37 | Amorphous polyester resin dispersion (1-1) | 15.5 parts | Amorphous polyester resin dispersion (2-1) | 15.5 parts | Crystalline polyester resin dispersion (1) | 15 parts | | | Crosslinked resin particle dispersion (1) | 11 parts |
| Example 38 | 38 | 38 | Amorphous polyester resin dispersion (1-1) | 17.5 parts | Amorphous polyester resin dispersion (2-1) | 17.5 parts | Crystalline polyester resin dispersion (1) | 14 parts | | | Crosslinked resin particle dispersion (1) | 11 parts |
| Example 39 | 39 | 39 | Amorphous polyester resin dispersion (1-1) | 18.5 parts | Amorphous polyester resin dispersion (2-1) | 18.5 parts | Crystalline polyester resin dispersion (1) | 24 parts | | | Crosslinked resin particle dispersion (1) | 3 parts |
| Example 40 | 40 | 40 | Amorphous polyester resin dispersion (1-1) | 20.5 parts | Amorphous polyester resin dispersion (2-1) | 20.5 parts | Crystalline polyester resin dispersion (1) | 21 parts | | | Crosslinked resin particle dispersion (1) | 3 parts |
| Example 41 | 41 | 1 | Amorphous polyester resin dispersion (1-1) | 20 parts | Amorphous polyester resin dispersion (2-1) | 20 parts | Crystalline polyester resin dispersion (1) | 18 parts | | | Crosslinked resin particle dispersion (1) | 5 parts |
| Example 42 | 42 | 1 | Amorphous polyester resin dispersion (1-1) | 20 parts | Amorphous polyester resin dispersion (2-1) | 20 parts | Crystalline polyester resin dispersion (1) | 18 parts | | | Crosslinked resin particle dispersion (1) | 5 parts |
| Example 43 | 43 | 1 | Amorphous polyester resin dispersion (1-1) | 20 parts | Amorphous polyester resin dispersion (2-1) | 20 parts | Crystalline polyester resin dispersion (1) | 18 parts | | | Crosslinked resin particle dispersion (1) | 5 parts |
| Example 44 | 44 | 1 | Amorphous polyester resin dispersion (1-1) | 20 parts | Amorphous polyester resin dispersion (2-1) | 20 parts | Crystalline polyester resin dispersion (1) | 18 parts | | | Crosslinked resin particle dispersion (1) | 5 parts |

TABLE 1-continued

| | Base particle composition | | | | | | | | | Volume-average particle size [um] | External additive | |
|---|---|---|---|---|---|---|---|---|---|---|---|---|
| | Raw materials prepared | | | | | Materials added after heating to 45° C. Amorphous resin dispersion | | | | | | |
| | Colorant particle dispersion (1) | Release agent particle dispersion (1) | Surfactant (PELEX SS-L) | Deionized water | Sorbitan acid stearate dispersion | | | | | | Type | Average particle size [nm] |
| Comparative Example 1 | 6 parts | 6 parts | 0.3 parts | 50 parts | | Amorphous polyester resin dispersion (1-14) | 15 parts | Amorphous polyester resin dispersion (2-14) | 15 parts | 4.8 | Silica | 130 |
| Comparative Example 2 | 6 parts | 6 parts | 0.3 parts | 50 parts | 0.5 parts | Amorphous polyester resin dispersion (1-14) | 14.5 parts | Amorphous polyester resin dispersion (2-14) | 15 parts | 4.8 | Silica | 130 |
| Example 1 | 6 parts | 6 parts | 0.3 parts | 50 parts | | Amorphous polyester resin dispersion (1-1) | 12.5 parts | Amorphous polyester resin dispersion (2-1) | 12.5 parts | 4.8 | Silica | 130 |
| Example 2 | 6 parts | 6 parts | 0.3 parts | 50 parts | | Amorphous polyester resin dispersion (1-2) | 12.5 parts | Amorphous polyester resin dispersion (2-2) | 12.5 parts | 5.1 | Silica | 130 |
| Example 3 | 6 parts | 6 parts | 0.3 parts | 50 parts | | Amorphous polyester resin dispersion (1-2) | 8.5 parts | Amorphous polyester resin dispersion (2-2) | 8.5 parts | 5.4 | Silica | 130 |
| Example 4 | 6 parts | 8 parts | 0.3 parts | 50 parts | | Amorphous polyester resin dispersion (1-3) | 12.5 parts | Amorphous polyester resin dispersion (2-3) | 12.5 parts | 4.9 | Silica | 130 |
| Example 5 | 6 parts | 8 parts | 0.3 parts | 50 parts | | Amorphous polyester resin dispersion (1-3) | 15 parts | Amorphous polyester resin dispersion (2-3) | 15 parts | 4.6 | Silica | 130 |
| Example 6 | 6 parts | 6 parts | 0.3 parts | 50 parts | | Amorphous polyester resin dispersion (1-1) | 12.5 parts | Amorphous polyester resin dispersion (2-1) | 12.5 parts | 5.0 | Silica | 130 |
| Example 7 | 6 parts | 6 parts | 0.3 parts | 50 parts | | Amorphous polyester resin dispersion (1-1) | 12.5 parts | Amorphous polyester resin dispersion (2-1) | 12.5 parts | 5.3 | Silica | 130 |
| Example 8 | 6 parts | 9 parts | 0.3 parts | 50 parts | | Amorphous polyester resin dispersion (1-1) | 9 parts | Amorphous polyester resin dispersion (2-1) | 9 parts | 5.7 | Silica | 130 |

TABLE 1-continued

| | | | | | | | | | | | |
|---|---|---|---|---|---|---|---|---|---|---|---|
| Example 9 | 6 parts | 9 parts | 0.3 parts | 50 parts | Amorphous polyester resin dispersion (1-1) | 9 parts | Amorphous polyester resin dispersion (2-1) | 9 parts | 5.0 | Silica | 130 |
| Example 10 | 6 parts | 6 parts | 0.3 parts | 50 parts | Amorphous polyester resin dispersion (1-4) | 12.5 parts | Amorphous polyester resin dispersion (2-1) | 12.5 parts | 4.9 | Silica | 130 |
| Example 11 | 6 parts | 6 parts | 0.3 parts | 50 parts | Amorphous polyester resin dispersion (1-4) | 12.5 parts | Amorphous polyester resin dispersion (2-1) | 12.5 parts | 4.5 | Silica | 130 |
| Example 12 | 6 parts | 6 parts | 0.3 parts | 50 parts | Amorphous polyester resin dispersion (1-5) | 12.5 parts | Amorphous polyester resin dispersion (2-1) | 12.5 parts | 5.2 | Silica | 130 |
| Example 13 | 6 parts | 6 parts | 0.3 parts | 50 parts | Amorphous polyester resin dispersion (1-5) | 12.5 parts | Amorphous polyester resin dispersion (2-1) | 12.5 parts | 5.0 | Silica | 130 |
| Example 14 | 6 parts | 6 parts | 0.3 parts | 50 parts | Amorphous polyester resin dispersion (1-6) | 12.5 parts | Amorphous polyester resin dispersion (2-4) | 12.5 parts | 4.7 | Silica | 130 |
| Example 15 | 6 parts | 6 parts | 0.3 parts | 50 parts | Amorphous polyester resin dispersion (1-6) | 12.5 parts | Amorphous polyester resin dispersion (2-5) | 12.5 parts | 5.7 | Silica | 130 |
| Example 16 | 6 parts | 6 parts | 0.3 parts | 50 parts | Amorphous polyester resin dispersion (1-7) | 12.5 parts | Amorphous polyester resin dispersion (2-7) | 12.5 parts | 5.2 | Silica | 130 |
| Example 17 | 6 parts | 6 parts | 0.3 parts | 50 parts | Amorphous polyester resin dispersion (1-7) | 12.5 parts | Amorphous polyester resin dispersion (2-7) | 12.5 parts | 5.5 | Silica | 130 |
| Example 18 | 6 parts | 6 parts | 0.3 parts | 50 parts | Amorphous styrene acrylic (A) resin dispersion | 12.5 parts | Amorphous styrene acrylic (B) resin dispersion | 12.5 parts | 4.9 | Silica | 130 |
| Example 19 | 6 parts | 9 parts | 0.3 parts | 50 parts | Amorphous polyester resin dispersion (1-8) | 12.5 parts | Amorphous polyester resin dispersion (2-8) | 12.5 parts | 4.6 | Silica | 130 |
| Example 20 | 6 parts | 6 parts | 0.3 parts | 50 parts | Amorphous polyester resin dispersion (1-1) | 12.5 parts | Amorphous polyester resin dispersion (2-1) | 12.5 parts | 4.4 | Silica | 130 |
| Example 21 | 6 parts | 6 parts | 0.3 parts | 50 parts | Amorphous polyester resin dispersion (1-9) | 12.5 parts | Amorphous polyester resin dispersion (2-9) | 12.5 parts | 5.1 | Silica | 130 |

TABLE 1-continued

| | | | | | | | | | | |
|---|---|---|---|---|---|---|---|---|---|---|
| Example 22 | 6 parts | 6 parts | 0.3 parts | 50 parts | Amorphous polyester resin dispersion (1-10) | 12.5 parts | Amorphous polyester resin dispersion (2-9) | 12.5 parts | 5.0 | Silica | 130 |
| Example 23 | 6 parts | 6 parts | 0.3 parts | 50 parts | Amorphous polyester resin dispersion (1-1) | 12.5 parts | Amorphous polyester resin dispersion (2-1) | 12.5 parts | 5.7 | Silica | 130 |
| Example 24 | 6 parts | 6 parts | 0.3 parts | 50 parts | Amorphous polyester resin dispersion (1-1) | 12.5 parts | Amorphous polyester resin dispersion (2-1) | 12.5 parts | 5.6 | Silica | 130 |
| Example 25 | 6 parts | 6 parts | 0.3 parts | 50 parts | Amorphous polyester resin dispersion (1-11) | 12.5 parts | Amorphous polyester resin dispersion (2-11) | 12.5 parts | 6.0 | Silica | 130 |
| Example 26 | 6 parts | 6 parts | 0.3 parts | 50 parts | Amorphous polyester resin dispersion (1-11) | 12.5 parts | Amorphous polyester resin dispersion (2-12) | 12.5 parts | 4.1 | Silica | 130 |
| Example 27 | 6 parts | 6 parts | 0.3 parts | 50 parts | Amorphous polyester resin dispersion (1-12) | 12.5 parts | Amorphous polyester resin dispersion (2-13) | 12.5 parts | 5.2 | Silica | 130 |
| Example 28 | 6 parts | 6 parts | 0.3 parts | 50 parts | Amorphous polyester resin dispersion (1-13) | 12.5 parts | polyester resin Amorphous dispersion (2-13) | 12.5 parts | 5.5 | Silica | 130 |
| Example 29 | 6 parts | 6 parts | 0.3 parts | 50 parts | Amorphous polyester resin dispersion (1-1) | 12.5 parts | Amorphous polyester resin dispersion (2-1) | 12.5 parts | 5.1 | Silica | 130 |
| Example 30 | 6 parts | 6 parts | 0.3 parts | 50 parts | Amorphous polyester resin dispersion (1-1) | 12.5 parts | Amorphous polyester resin dispersion (2-1) | 12.5 parts | 4.3 | Silica | 130 |
| Example 31 | 6 parts | 6 parts | 0.3 parts | 50 parts | Amorphous polyester resin dispersion (1-12) | 12.5 parts | Amorphous polyester resin dispersion (2-13) | 12.5 parts | 4.9 | Silica | 130 |
| Example 32 | 6 parts | 6 parts | 0.3 parts | 50 parts | Amorphous polyester resin dispersion (1-12) | 12.5 parts | Amorphous polyester resin dispersion (2-13) | 12.5 parts | 5.6 | Silica | 130 |
| Example 33 | 6 parts | 6 parts | 0.3 parts | 50 parts | Amorphous polyester resin dispersion (1-1) | 12.5 parts | Amorphous polyester resin dispersion (2-1) | 12.5 parts | 5.0 | Silica | 130 |
| Example 34 | 6 parts | 6 parts | 0.3 parts | 50 parts | Amorphous polyester resin dispersion (1-1) | 12.5 parts | Amorphous polyester resin dispersion (2-1) | 12.5 parts | 4.5 | Silica | 130 |

TABLE 1-continued

| | | | | | | | | | | | |
|---|---|---|---|---|---|---|---|---|---|---|---|
| Example 35 | 6 parts | 5 parts | 0.3 parts | 50 parts | | Amorphous polyester resin dispersion (1-1) | 12.5 parts | Amorphous polyester resin dispersion (2-1) | 12.5 parts | 4.8 | Silica | 130 |
| Example 36 | 6 parts | 5 parts | 0.3 parts | 50 parts | | Amorphous polyester resin dispersion (1-1) | 12.5 parts | Amorphous polyester resin dispersion (2-1) | 12.5 parts | 5.4 | Silica | 130 |
| Example 37 | 6 parts | 12 parts | 0.3 parts | 50 parts | | Amorphous polyester resin dispersion (1-1) | 12.5 parts | Amorphous polyester resin dispersion (2-1) | 12.5 parts | 5.9 | Silica | 130 |
| Example 38 | 6 parts | 9 parts | 0.3 parts | 50 parts | | Amorphous polyester resin dispersion (1-1) | 12.5 parts | Amorphous polyester resin dispersion (2-1) | 12.5 parts | 4.9 | Silica | 130 |
| Example 39 | 6 parts | 5 parts | 0.3 parts | 50 parts | | Amorphous polyester resin dispersion (1-1) | 12.5 parts | Amorphous polyester resin dispersion (2-1) | 12.5 parts | 5.1 | Silica | 130 |
| Example 40 | 6 parts | 4 parts | 0.3 parts | 50 parts | | Amorphous polyester resin dispersion (1-1) | 12.5 parts | Amorphous polyester resin dispersion (2-1) | 12.5 parts | 5.0 | Silica | 130 |
| Example 41 | 6 parts | 6 parts | 0.3 parts | 50 parts | | Amorphous polyester resin dispersion (1-1) | 12.5 parts | Amorphous polyester resin dispersion (2-1) | 12.5 parts | 4.8 | Silica | 45 |
| Example 42 | 6 parts | 6 parts | 0.3 parts | 50 parts | | Amorphous polyester resin dispersion (1-1) | 12.5 parts | Amorphous polyester resin dispersion (2-1) | 12.5 parts | 4.8 | Silica | 55 |
| Example 43 | 6 parts | 6 parts | 0.3 parts | 50 parts | | Amorphous polyester resin dispersion (1-1) | 12.5 parts | Amorphous polyester resin dispersion (2-1) | 12.5 parts | 4.8 | Stron-tium titanate | 280 |
| Example 44 | 6 parts | 6 parts | 0.3 parts | 50 parts | | Amorphous polyester resin dispersion (1-1) | 12.5 parts | Amorphous polyester resin dispersion (2-1) | 12.5 parts | 4.8 | Stron-tium titanate | 310 |

TABLE 2-1

| | Toner No. | Content of amorphous resin Wa % by mass | Content of crystalline resin Wc % by mass | Wc/(Wa + Wc) = W1 — | Content of crystalline polyester resin Wcp % by mass | Content of release agent Ww % by mass | Wcp/Ww — | Content of crosslinked resin particles % by mass |
|---|---|---|---|---|---|---|---|---|
| Comparative Example 1 | 45 | 70 | 18 | 0.20 | 18 | 6 | 3.0 | 0 |
| Comparative Example 2 | 46 | 69.5 | 18 | 0.21 | 18 | 6 | 3.0 | 0 |
| Example 1 | 1 | 65 | 18 | 0.22 | 18 | 6 | 3.0 | 5 |
| Example 2 | 2 | 69 | 15 | 0.18 | 15 | 6 | 2.5 | 4 |
| Example 3 | 3 | 69 | 15 | 0.18 | 15 | 6 | 2.5 | 4 |
| Example 4 | 4 | 44 | 27 | 0.38 | 27 | 8 | 3.4 | 15 |
| Example 5 | 5 | 44 | 27 | 0.38 | 27 | 8 | 3.4 | 15 |
| Example 6 | 6 | 73 | 12 | 0.14 | 12 | 6 | 2 | 3 |
| Example 7 | 7 | 71 | 14 | 0.16 | 14 | 6 | 2.3 | 3 |
| Example 8 | 8 | 33 | 32 | 0.49 | 32 | 9 | 3.6 | 20 |
| Example 9 | 9 | 31 | 34 | 0.52 | 34 | 9 | 3.8 | 20 |
| Example 10 | 10 | 60 | 23 | 0.28 | 23 | 6 | 3.8 | 5 |
| Example 11 | 11 | 60 | 23 | 0.28 | 23 | 6 | 3.8 | 5 |
| Example 12 | 12 | 65 | 18 | 0.22 | 18 | 6 | 3.0 | 5 |
| Example 13 | 13 | 65 | 18 | 0.22 | 18 | 6 | 3.0 | 5 |
| Example 14 | 14 | 65 | 18 | 0.22 | 18 | 6 | 3.0 | 5 |
| Example 15 | 15 | 65 | 18 | 0.22 | 18 | 6 | 3.0 | 5 |
| Example 16 | 16 | 65 | 18 | 0.22 | 18 | 6 | 3.0 | 5 |
| Example 17 | 17 | 65 | 18 | 0.22 | 18 | 6 | 3.0 | 5 |
| Example 18 | 18 | 67 | 14 | 0.17 | 0 | 6 | 0.0 | 7 |
| Example 19 | 19 | 65 | 18 | 0.22 | 18 | 6 | 3.0 | 5 |
| Example 20 | 20 | 65 | 18 | 0.22 | 18 | 6 | 3.0 | 5 |
| Example 21 | 21 | 65 | 18 | 0.22 | 18 | 6 | 3.0 | 5 |
| Example 22 | 22 | 65 | 18 | 0.22 | 18 | 6 | 3.0 | 5 |
| Example 23 | 23 | 65 | 18 | 0.22 | 18 | 6 | 3.0 | 5 |
| Example 24 | 24 | 65 | 18 | 0.22 | 18 | 6 | 3.0 | 5 |
| Example 25 | 25 | 65 | 18 | 0.22 | 18 | 6 | 3.0 | 5 |
| Example 26 | 26 | 65 | 18 | 0.22 | 18 | 6 | 3.0 | 5 |
| Example 27 | 27 | 65 | 18 | 0.22 | 18 | 6 | 3.0 | 5 |
| Example 28 | 28 | 65 | 18 | 0.22 | 18 | 6 | 3.0 | 5 |
| Example 29 | 29 | 65 | 18 | 0.22 | 10.4 | 6 | 1.7 | 5 |
| Example 30 | 30 | 65 | 18 | 0.22 | 11.2 | 6 | 1.9 | 5 |
| Example 31 | 31 | 65 | 18 | 0.22 | 13.5 | 6 | 2.3 | 5 |
| Example 32 | 32 | 65 | 18 | 0.22 | 12.8 | 6 | 2.1 | 5 |
| Example 33 | 33 | 67 | 21 | 0.24 | 21 | 6 | 3.5 | 0 |
| Example 34 | 34 | 65 | 21.5 | 0.25 | 21.5 | 6 | 3.6 | 1.5 |
| Example 35 | 35 | 49 | 12 | 0.20 | 12 | 5 | 2.4 | 28 |
| Example 36 | 36 | 47 | 11 | 0.19 | 11 | 5 | 2.2 | 31 |
| Example 37 | 37 | 56 | 15 | 0.21 | 15 | 12 | 1.3 | 11 |
| Example 38 | 38 | 60 | 14 | 0.19 | 14 | 9 | 1.6 | 11 |
| Example 39 | 39 | 62 | 24 | 0.28 | 24 | 5 | 4.8 | 3 |
| Example 40 | 40 | 66 | 21 | 0.24 | 21 | 4 | 5.3 | 3 |
| Example 41 | 41 | 65 | 18 | 0.22 | 18 | 6 | 3.0 | 5 |
| Example 42 | 42 | 65 | 18 | 0.22 | 18 | 6 | 3.0 | 5 |
| Example 43 | 43 | 65 | 18 | 0.22 | 18 | 6 | 3.0 | 5 |
| Example 44 | 44 | 65 | 18 | 0.22 | 18 | 6 | 3.0 | 5 |

TABLE 2-2

| | THF-soluble fraction Resin having molecular weight of 5,000 or less | | | | Amorphous polyester resin | | |
|---|---|---|---|---|---|---|---|
| | Mass ratio of amorphous resin WaL % by mass | Mass ratio of crystalline resin WcL % by mass | WcL/(WaL + WcL) = W2 — | W2/W1 — | Molecular weight of 5,000 or less Mass ratio of unit represented by Formula (1) RL1 % by mass | Molecular weight of 50,000 or more Mass ratio of unit represented by Formula (1) RH1 % by mass | RL1/RH1 — |
| Comparative Example 1 | 86 | 14 | 0.14 | 0.68 | 0 | 0 | — |
| Comparative Example 2 | 86 | 14 | 0.14 | 0.68 | 0 | 0 | — |
| Example 1 | 88 | 12 | 0.12 | 0.55 | 4.5 | 15.5 | 0.29 |
| Example 2 | 89 | 11 | 0.11 | 0.62 | 10.5 | 25.5 | 0.41 |
| Example 3 | 89 | 11 | 0.11 | 0.62 | 11.5 | 25.5 | 0.45 |

TABLE 2-2-continued

| | THF-soluble fraction Resin having molecular weight of 5,000 or less | | | | Amorphous polyester resin | | |
|---|---|---|---|---|---|---|---|
| | | | | | Molecular weight of 5,000 or less | Molecular weight of 50,000 or more | |
| | Mass ratio of amorphous resin WaL % by mass | Mass ratio of crystalline resin WcL % by mass | WcL/(WaL + WcL) = W2 — | W2/W1 — | Mass ratio of unit represented by Formula (1) RL1 % by mass | Mass ratio of unit represented by Formula (1) RH1 % by mass | RL1/RH1 — |
| Example 4 | 73 | 27 | 0.27 | 0.71 | 6.5 | 24 | 0.27 |
| Example 5 | 73 | 27 | 0.27 | 0.71 | 6.5 | 24 | 0.27 |
| Example 6 | 92 | 8 | 0.08 | 0.57 | 4.5 | 15.5 | 0.29 |
| Example 7 | 91 | 9 | 0.09 | 0.55 | 4.5 | 15.5 | 0.29 |
| Example 8 | 68 | 32 | 0.32 | 0.65 | 4.5 | 15.5 | 0.29 |
| Example 9 | 66 | 34 | 0.34 | 0.65 | 4.5 | 15.5 | 0.29 |
| Example 10 | 97.5 | 2.5 | 0.025 | 0.09 | 2.5 | 16 | 0.16 |
| Example 11 | 97 | 3 | 0.03 | 0.11 | 2.5 | 16 | 0.16 |
| Example 12 | 83 | 17 | 0.17 | 0.78 | 7 | 11 | 0.64 |
| Example 13 | 82 | 18 | 0.18 | 0.83 | 7 | 11 | 0.64 |
| Example 14 | 88 | 12 | 0.12 | 0.55 | 1.5 | 16.0 | 0.09 |
| Example 15 | 88 | 12 | 0.12 | 0.55 | 1.8 | 16 | 0.11 |
| Example 16 | 88 | 12 | 0.12 | 0.55 | 12 | 15.5 | 0.77 |
| Example 17 | 88 | 12 | 0.12 | 0.55 | 12.5 | 15 | 0.83 |
| Example 18 | 86 | 14 | 0.14 | 0.81 | — | — | — |
| Example 19 | 89 | 11 | 0.11 | 0.51 | 0 | 0 | — |
| Example 20 | 88 | 12 | 0.12 | 0.55 | 4.5 | 15.5 | 0.29 |
| Example 21 | 86 | 14 | 0.14 | 0.65 | 4 | 14 | 0.29 |
| Example 22 | 85 | 15 | 0.15 | 0.69 | 7.5 | 23 | 0.33 |
| Example 23 | 90 | 10 | 0.1 | 0.46 | 4.5 | 15.5 | 0.29 |
| Example 24 | 87 | 13 | 0.13 | 0.60 | 4.5 | 15.5 | 0.29 |
| Example 25 | 88 | 12 | 0.12 | 0.55 | 0.3 | 1.2 | 0.25 |
| Example 26 | 89 | 11 | 0.11 | 0.51 | 0.4 | 2.3 | 0.17 |
| Example 27 | 88 | 12 | 0.12 | 0.55 | 21 | 38 | 0.55 |
| Example 28 | 88 | 12 | 0.12 | 0.55 | 24 | 39 | 0.62 |
| Example 29 | 87 | 13 | 0.13 | 0.60 | 4.5 | 15.5 | 0.29 |
| Example 30 | 88 | 12 | 0.12 | 0.55 | 4.5 | 15.5 | 0.29 |
| Example 31 | 88 | 12 | 0.12 | 0.55 | 21 | 38 | 0.55 |
| Example 32 | 88 | 12 | 0.12 | 0.55 | 21 | 38 | 0.55 |
| Example 33 | 85 | 15 | 0.15 | 0.63 | 4.5 | 15.5 | 0.29 |
| Example 34 | 84 | 16 | 0.16 | 0.64 | 4.5 | 15.5 | 0.29 |
| Example 35 | 90 | 10 | 0.1 | 0.51 | 4.5 | 15.5 | 0.29 |
| Example 36 | 91 | 9 | 0.09 | 0.47 | 4.5 | 15.5 | 0.29 |
| Example 37 | 88 | 12 | 0.12 | 0.57 | 4.5 | 15.5 | 0.29 |
| Example 38 | 90 | 10 | 0.1 | 0.53 | 4.5 | 15.5 | 0.29 |
| Example 39 | 83 | 17 | 0.17 | 0.61 | 4.5 | 15.5 | 0.29 |
| Example 40 | 85 | 15 | 0.15 | 0.62 | 4.5 | 15.5 | 0.29 |
| Example 41 | 88 | 12 | 0.12 | 0.55 | 4.5 | 15.5 | 0.29 |
| Example 42 | 88 | 12 | 0.12 | 0.55 | 4.5 | 15.5 | 0.29 |
| Example 43 | 88 | 12 | 0.12 | 0.55 | 4.5 | 15.5 | 0.29 |
| Example 44 | 88 | 12 | 0.12 | 0.55 | 4.5 | 15.5 | 0.29 |

TABLE 2-3

| | Mass ratio of unit represented by Formula (1) to all dicarboxylic acid units in entire amorphous polyester resin R1 | Mass ratio of unit represented by Formula (2) to all dicarboxylic acid units in entire crystalline polyester resin R2 | | Toner particles | | External additive | | | |
|---|---|---|---|---|---|---|---|---|---|
| | | | | Condition (1) Total amount of heat generated | Condition (2) Total amount of heat generated | | | | |
| | % by mass | % by mass | R1/R2 — | J/g | J/g | Type — | Average particle size nm | Evaluation 1 — | Evaluation 2 — |
| Comparative Example 1 | 0 | 100 | 0.00 | 0.3 | 0 | Silica | 130 | D | D |
| Comparative Example 2 | 0 | 100 | 0.00 | 4.6 | 3.7 | Silica | 130 | A | D |
| Example 1 | 10.3 | 100 | 0.10 | 7.5 | 0 | Silica | 130 | A | A |
| Example 2 | 17.8 | 100 | 0.178 | 1.8 | 0 | Silica | 130 | C | C |
| Example 3 | 18.3 | 100 | 0.183 | 2.1 | 0.2 | Silica | 130 | B | B |
| Example 4 | 16.8 | 100 | 0.17 | 14.8 | 0.2 | Silica | 130 | B | B |

TABLE 2-3-continued

| | Mass ratio of unit represented by Formula (1) to all dicarboxylic acid units in entire amorphous polyester resin R1 | Mass ratio of unit represented by Formula (2) to all dicarboxylic acid units in entire crystalline polyester resin R2 | | Toner particles | | External additive | | | |
|---|---|---|---|---|---|---|---|---|---|
| | | | | Condition (1) Total amount of heat generated | Condition (2) Total amount of heat generated | | Average particle size | | |
| | | | R1/R2 | | | Type | | Evaluation 1 | Evaluation 2 |
| | % by mass | % by mass | — | J/g | J/g | — | nm | — | — |
| Example 5 | 16.8 | 100 | 0.17 | 15.3 | 0.2 | Silica | 130 | B | C |
| Example 6 | 10.3 | 100 | 0.10 | 1.7 | 0 | Silica | 130 | C | C |
| Example 7 | 10.3 | 100 | 0.10 | 2.5 | 0 | Silica | 130 | B | B |
| Example 8 | 10.3 | 100 | 0.10 | 14.4 | 0.3 | Silica | 130 | B | B |
| Example 9 | 10.3 | 100 | 0.10 | 15.2 | 0.4 | Silica | 130 | B | C |
| Example 10 | 10.3 | 100 | 0.10 | 15.5 | 0.4 | Silica | 130 | B | C |
| Example 11 | 10.3 | 100 | 0.10 | 14.7 | 0.3 | Silica | 130 | B | B |
| Example 12 | 10.3 | 100 | 0.10 | 2.2 | 0.3 | Silica | 130 | B | B |
| Example 13 | 10.3 | 100 | 0.10 | 1.8 | 0.3 | Silica | 130 | C | C |
| Example 14 | 12.7 | 100 | 0.13 | 15.2 | 0 | Silica | 130 | C | C |
| Example 15 | 19.7 | 100 | 0.20 | 14.5 | 0 | Silica | 130 | B | B |
| Example 16 | 13.9 | 100 | 0.14 | 5.2 | 0.3 | Silica | 130 | A | B |
| Example 17 | 13.9 | 100 | 0.14 | 4.9 | 0.5 | Silica | 130 | A | C |
| Example 18 | — | — | — | 1.7 | 0.5 | Silica | 130 | C | C |
| Example 19 | 0 | 100 | 0.00 | 6.1 | 0.5 | Silica | 130 | A | C |
| Example 20 | 10.3 | 0 | — | 7.9 | 0.5 | Silica | 130 | A | C |
| Example 21 | 9.5 | 100 | 0.10 | 9.6 | 0.5 | Silica | 130 | A | C |
| Example 22 | 17.4 | 100 | 0.17 | 1.8 | 0 | Silica | 130 | C | C |
| Example 23 | 10.3 | 100 | 0.10 | 6.6 | 0.5 | Silica | 130 | A | C |
| Example 24 | 10.3 | 100 | 0.10 | 1.9 | 0.2 | Silica | 130 | C | C |
| Example 25 | 0.8 | 100 | 0.008 | 6.9 | 0.5 | Silica | 130 | A | C |
| Example 26 | 1.4 | 100 | 0.014 | 6.6 | 0.3 | Silica | 130 | A | B |
| Example 27 | 29.4 | 100 | 0.29 | 2.2 | 0 | Silica | 130 | B | B |
| Example 28 | 30.4 | 100 | 0.30 | 1.9 | 0 | Silica | 130 | C | C |
| Example 29 | 10.3 | 58 | 0.18 | 8.1 | 0.5 | Silica | 130 | A | C |
| Example 30 | 10.3 | 62 | 0.17 | 8 | 0.4 | Silica | 130 | A | B |
| Example 31 | 29.4 | 76 | 0.39 | 2.1 | 0 | Silica | 130 | B | B |
| Example 32 | 29.4 | 71 | 0.41 | 1.9 | 0 | Silica | 130 | C | C |
| Example 33 | 10.3 | 100 | 0.10 | 1.7 | 0 | Silica | 130 | C | C |
| Example 34 | 10.3 | 100 | 0.10 | 2.2 | 0 | Silica | 130 | B | B |
| Example 35 | 10.3 | 100 | 0.10 | 5.4 | 0.4 | Silica | 130 | A | B |
| Example 36 | 10.3 | 100 | 0.10 | 5.1 | 0.5 | Silica | 130 | A | C |
| Example 37 | 10.3 | 100 | 0.10 | 4.8 | 0.1 | Silica | 130 | C | C |
| Example 38 | 10.3 | 100 | 0.10 | 5.2 | 0.2 | Silica | 130 | B | B |
| Example 39 | 10.3 | 100 | 0.10 | 7.7 | 0.3 | Silica | 130 | B | B |
| Example 40 | 10.3 | 100 | 0.10 | 7.9 | 0.3 | Silica | 130 | C | C |
| Example 41 | 10.3 | 100 | 0.10 | 7.5 | 0 | Silica | 45 | C | C |
| Example 42 | 10.3 | 100 | 0.10 | 7.5 | 0 | Silica | 55 | B | B |
| Example 43 | 10.3 | 100 | 0.10 | 7.5 | 0 | Strontium titanate | 280 | B | B |
| Example 44 | 10.3 | 100 | 0.10 | 7.5 | 0 | Strontium titanate | 310 | C | C |

The electrostatic charge image developing toner, the electrostatic charge image developer, the toner cartridge, the process cartridge, the image forming apparatus, and the image forming method of the present disclosure include the following aspects.

(((1)))

An electrostatic charge image developing toner comprising:

toner particles that contain a binder resin containing an amorphous resin and a crystalline resin and satisfy the following condition (1) and condition (2), condition (1): in a case where differential scanning calorimetry is performed by the following thermal process (1), a total amount of heat generated at an exothermic peak in a temperature range of 30° C. or higher and 70° C. or lower during a reheating period is more than 0.5 J/g, condition (2): in a case where differential scanning calorimetry is performed by the following thermal process (2), a total amount of heat generated at an exothermic peak in a temperature range of 30° C. or higher and 70° C. or lower during a reheating period is 0.5 J/g or less, thermal process (1): heating to 150° C. from 0° C. at a rate of 10° C./min, then cooling to 0° C. from 150° C. at a rate of 50° C./min, followed by reheating to 150° C. from 0° C. at a rate of 10° C./min, thermal process (2): heating to 150° C. from 0° C. at a rate of 10° C./min, then cooling to 0° C. from 150° C. at a rate of 1° C./min, followed by reheating to 150° C. from 0° C. at a rate of 10° C./min.

(((2)))

The electrostatic charge image developing toner according to (((1))), wherein the total amount of heat generated at the exothermic peak in the condition (1) is 2.0 J/g or more and 15.0 J/g or less.

(((3)))

The electrostatic charge image developing toner according to (((1))) or (((2))), wherein in a case where Wa represents a mass ratio of the amorphous resin contained in the toner particles, Wc represents a mass ratio of the crystalline resin contained in the toner particles, and $Wc/(Wa+Wc)=W1$, $0.15 \leq W1 \leq 0.50$.

(((4)))

The electrostatic charge image developing toner according to (((3))), wherein in a case where WaL represents a mass ratio of the amorphous resin that is contained in a resin having a molecular weight of 5,000 or less contained in a tetrahydrofuran-soluble fraction of the toner particles, WcL represents a mass ratio of the crystalline resin that is contained in a resin having a molecular weight of 5,000 or less contained in a tetrahydrofuran-soluble fraction of the toner particles, and $WcL/(WaL+WcL)=W2$, $0.1 \leq W2/W1 \leq 0.8$.

(((5)))

The electrostatic charge image developing toner according to any one of (((1))) to (((4))), wherein the amorphous resin contains an amorphous polyester resin, the amorphous polyester resin contains an amorphous polyester resin having a unit represented by Formula (1), and in a case where RL1 represents a mass ratio of the unit represented by Formula (1) to all dicarboxylic acid units in an entire amorphous polyester resin having a molecular weight of 5,000 or less in the amorphous polyester resin, and RH1 represents a mass ratio of the unit represented by Formula (1) to all dicarboxylic acid units in an entire amorphous polyester resin having a molecular weight of 50,000 or more in the amorphous polyester resin, $0.1 \leq RL1/RH1 \leq 0.8$.

(((6)))

The electrostatic charge image developing toner according to any one of (((1))) to (((5))), wherein the amorphous resin contains an amorphous polyester resin, the crystalline resin contains a crystalline polyester resin, the amorphous polyester resin contains an amorphous polyester resin having an aliphatic dicarboxylic acid unit, and the crystalline polyester resin contains a crystalline polyester resin having an aliphatic dicarboxylic acid unit.

(((7)))

The electrostatic charge image developing toner according to any one of (((1))) to (((6))), wherein the amorphous resin contains an amorphous polyester resin, the crystalline resin contains a crystalline polyester resin, the amorphous polyester resin contains an amorphous polyester resin having a unit represented by Formula (1), and the crystalline polyester resin contains a crystalline polyester resin having a unit represented by Formula (2).

(((8)))

The electrostatic charge image developing toner according to (((7))), wherein a mass ratio of the unit represented by Formula (1) to all dicarboxylic acid units in the entire amorphous polyester resin is 1% by mass or more and 30% by mass or less, and a mass ratio of the unit represented by Formula (2) to all dicarboxylic acid units in the entire crystalline polyester resin is 60% by mass or more and 100% by mass or less.

(((9)))

The electrostatic charge image developing toner according to (((7))) or (((8))), wherein in a case where R1 represents a mass ratio of the unit represented by Formula (1) to all dicarboxylic acid units in the entire amorphous polyester resin, and R2 represents a mass ratio of the unit represented by Formula (2) to all dicarboxylic acid units in the entire crystalline polyester resin, $0.01 \leq R1/R2 \leq 0.40$.

(((10)))

The electrostatic charge image developing toner according to any one of (((1))) to (((9))), wherein the toner particles further contain crosslinked resin particles, and a mass ratio of the crosslinked resin particles to the toner particles is 1% by mass or more and 30% by mass or less.

(((11)))

An electrostatic charge image developing toner according to any one of (((1))) to (((10))), wherein the toner particles further contain a release agent, the crystalline resin contains a crystalline polyester resin, and in a case where Wcp represents a content of the crystalline polyester resin contained in the toner particles, and Ww represents a content of the release agent contained in the toner particles, $1.5 \leq Wcp/Ww \leq 5.0$.

(((12)))

The electrostatic charge image developing toner according to any one of (((1))) to (((11))), further comprising:

inorganic particles added to an exterior of the toner particles, wherein an average particle size of the inorganic particles is 50 nm or more and 300 nm or less.

(((13)))

An electrostatic charge image developer comprising:

the electrostatic charge image developing toner according to any one of (((1))) to (((12))).

(((14)))

A toner cartridge comprising:

a container that contains the electrostatic charge image developing toner according to any one of (((1))) to (((12))), wherein the toner cartridge is detachable from an image forming apparatus.

(((15)))

A process cartridge comprising:

a developing unit that contains the electrostatic charge image developer described in (((13))) and develops an electrostatic charge image formed on a surface of an image holder as a toner image by using the electrostatic charge image developer, wherein the process cartridge is detachable from an image forming apparatus.

(((16)))

An image forming apparatus comprising:

an image holder, a charging unit that charges a surface of the image holder;

an electrostatic charge image forming unit that forms an electrostatic charge image on the charged surface of the image holder;

a developing unit that contains the electrostatic charge image developer described in (((13))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

(((17)))

An image forming method comprising:

charging a surface of an image holder, forming an electrostatic charge image on the charged surface of the image holder;

developing the electrostatic charge image formed on the surface of the image holder as a toner image by using the electrostatic charge image developer described in (((13)));

transferring the toner image formed on the surface of the image holder to a surface of a recording medium; and fixing the toner image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles that contain a binder resin containing an amorphous resin and a crystalline resin and satisfy the following condition (1) and condition (2), condition (1): in a case where differential scanning calorimetry is performed by the following thermal process (1), a total amount of heat generated at an exothermic peak in a temperature range of 30° C. or higher and 70° C. or lower during a reheating period is more than 0.5 J/g, condition (2): in a case where differential scanning calorimetry is performed by the following thermal process (2), a total amount of heat generated at an exothermic peak in a temperature range of 30° C. or higher and 70° C. or lower during a reheating period is 0.5 J/g or less, thermal process (1): heating to 150° C. from 0° C. at a rate of 10° C./min, then cooling to 0° C. from 150° C. at a rate of 50° C./min, followed by reheating to 150° C. from 0° C. at a rate of 10° C./min, thermal process (2): heating to 150° C. from 0° C. at a rate of 10° C./min, then cooling to 0° C. from 150° C. at a rate of 1° C./min, followed by reheating to 150° C. from 0° C. at a rate of 10° C./min, wherein the amorphous resin contains an amorphous polyester resin, the crystalline resin contains a crystalline polyester resin, the amorphous polyester resin contains an amorphous polyester resin having a unit represented by Formula (1), and the crystalline polyester resin contains a crystalline polyester resin having a unit represented by Formula (2), Formula (1)

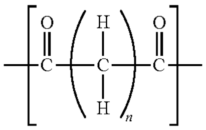

Formula (2)

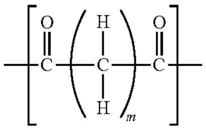

in Formula (1), n is an integer of 4 or more and 12 or less, in Formula (2), m is an integer of 4 or more and 12 or less.

2. The electrostatic charge image developing toner according to claim 1, wherein the total amount of heat generated at the exothermic peak in the condition (1) is 2.0 J/g or more and 15.0 J/g or less.

3. The electrostatic charge image developing toner according to claim 1, wherein in a case where Wa represents a mass ratio of the amorphous resin contained in the toner particles, Wc represents a mass ratio of the crystalline resin contained in the toner particles, and $Wc/(Wa+Wc)=W1$, $0.15 \leq W1 \leq 0.50$.

4. The electrostatic charge image developing toner according to claim 3, wherein in a case where Wal represents a mass ratio of the amorphous resin that is contained in a resin having a molecular weight of 5,000 or less contained in a tetrahydrofuran-soluble fraction of the toner particles, WcL represents a mass ratio of the crystalline resin that is contained in a resin having a molecular weight of 5,000 or less contained in a tetrahydrofuran-soluble fraction of the toner particles, and $WcL/(WaL+WcL)=W2$, $0.1 \leq W2/W1 \leq 0.8$.

5. The electrostatic charge image developing toner according to claim 1, wherein in a case where RL1 represents a mass ratio of the unit represented by Formula (1) to all dicarboxylic acid units in an entire amorphous polyester resin having a molecular weight of 5,000 or less in the amorphous polyester resin, and RH1 represents a mass ratio of the unit represented by Formula (1) to all dicarboxylic acid units in an entire amorphous polyester resin having a molecular weight of 50,000 or more in the amorphous polyester resin, $0.1 \leq RL1/RH1 \leq 0.8$.

6. The electrostatic charge image developing toner according to claim 1, wherein a mass ratio of the unit represented by Formula (1) to all dicarboxylic acid units in the entire amorphous polyester resin is 1% by mass or more and 30% by mass or less, and a mass ratio of the unit represented by Formula (2) to all dicarboxylic acid units in the entire crystalline polyester resin is 60% by mass or more and 100% by mass or less.

7. The electrostatic charge image developing toner according to claim 1, wherein in a case where R1 represents a mass ratio of the unit represented by Formula (1) to all dicarboxylic acid units in the entire amorphous polyester resin, and R2 represents a mass ratio of the unit represented by Formula (2) to all dicarboxylic acid units in the entire crystalline polyester resin, $0.01 \leq R1/R2 \leq 0.40$.

8. The electrostatic charge image developing toner according to claim 1, wherein the toner particles further contain crosslinked resin particles, and a mass ratio of the crosslinked resin particles to the toner particles is 1% by mass or more and 30% by mass or less.

9. The electrostatic charge image developing toner according to claim 1, wherein the toner particles further contain a release agent, and in a case where Wcp represents a content of the crystalline polyester resin contained in the toner particles, and Ww represents a content of the release agent contained in the toner particles, $1.5 \leq Wcp/Ww \leq 5.0$.

10. The electrostatic charge image developing toner according to claim 1, further comprising:

inorganic particles added to an exterior of the toner particles, wherein an average particle size of the inorganic particles is 50 nm or more and 300 nm or less.

11. An electrostatic charge image developer comprising:

the electrostatic charge image developing toner according to claim 1.

12. An electrostatic charge image developer comprising:

the electrostatic charge image developing toner according to claim 2.

13. An electrostatic charge image developer comprising:

the electrostatic charge image developing toner according to claim 3.

14. An electrostatic charge image developer comprising:

the electrostatic charge image developing toner according to claim 4.

15. A toner cartridge comprising:

a container that contains the electrostatic charge image developing toner according to claim 1, wherein the toner cartridge is detachable from an image forming apparatus.

16. A process cartridge comprising:

a developing unit that contains the electrostatic charge image developer according to claim 11 and develops an electrostatic charge image formed on a surface of an image holder as a toner image by using the electrostatic charge image developer, wherein the process cartridge is detachable from an image forming apparatus.

17. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 11 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

18. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 11;

transferring the toner image formed on the surface of the image holder to a surface of a recording medium; and fixing the toner image transferred to the surface of the recording medium.

* * * * *